US009044746B2

(12) United States Patent
Podlaha-Murphy et al.

(10) Patent No.: US 9,044,746 B2
(45) Date of Patent: Jun. 2, 2015

(54) PHOTOCATALYST WITH ENHANCED STABILITY FOR HYDROGEN PRODUCTION AND OXIDATIVE REACTIONS

(75) Inventors: Elizabeth J. Podlaha-Murphy, West Roxbury, MA (US); Savidra Lucatero, Boston, MA (US)

(73) Assignee: NORTHEASTERN UNIVERSITY, Boston, MA (US)

( * ) Notice: Subject to any disclaimer, the term of this patent is extended or adjusted under 35 U.S.C. 154(b) by 5 days.

(21) Appl. No.: 13/824,583

(22) PCT Filed: Sep. 16, 2011

(86) PCT No.: PCT/US2011/051963
§ 371 (c)(1),
(2), (4) Date: Mar. 18, 2013

(87) PCT Pub. No.: WO2012/037478
PCT Pub. Date: Mar. 22, 2012

(65) Prior Publication Data
US 2013/0180861 A1   Jul. 18, 2013

Related U.S. Application Data

(60) Provisional application No. 61/383,525, filed on Sep. 16, 2010.

(51) Int. Cl.
*B01J 23/42* (2006.01)
*B01J 23/48* (2006.01)
(Continued)

(52) U.S. Cl.
CPC ............ *B01J 35/004* (2013.01); *B01J 21/063* (2013.01); *B01J 23/52* (2013.01); *B01J 23/8906* (2013.01);
(Continued)

(58) Field of Classification Search
USPC ........ 502/325, 350; 204/290.08; 205/76, 170, 205/340, 687; 427/123, 125, 126.5, 126.6
IPC .......... B01J 21/063,23/42, 23/48, 23/50, 23/52, B01J 23/745, 23/75, 23/8906, 23/8913, 35/004, B01J 37/00, 2331/70; B23H 3/04, 5/10, 7/22; C25B 1/00, 3/00, 11/00; C25C 1/00, 3/00, C25C 7/02; C25D 1/04, 5/10, 17/10; C25F 7/00
See application file for complete search history.

(56) References Cited

U.S. PATENT DOCUMENTS 8,734,625 B2 *   5/2014   Suzuki et al. .................. 204/278
2013/0180932 A1 *  7/2013   Fukumura et al. ............ 210/749

FOREIGN PATENT DOCUMENTS

WO    2012/037478    *   3/2012   ............... B01J 23/00

OTHER PUBLICATIONS

"Mechanisms and Applications of Plasmon-Induced Charge Separation at TiO2 Films Loaded with Gold Nanoparticles," Yang Tian et al. J. Am. Chem. Soc. 2005, 127, pp. 7632-7637.*
(Continued)

*Primary Examiner* — Patricia L Hailey
(74) *Attorney, Agent, or Firm* — Posternak Blankstein & Lund LLP

(57) ABSTRACT

A $TiO_2$-based photocatalyst is fabricated as a composite of titania with adhered nanostructures which contain a non-noble metal in galvanic contact with a noble metal. The catalyst effectively overcome aging and/or deactivation effects observed in a system free of the non-noble metal. The composite material showed a corrosion protective effect on the photoactivity of fresh catalyst for over 180-240 days, and it enhanced the rate of the water reduction reaction relative to bare $TiO_2$. Variations in porosity and non-noble metal content of the alloy portion of the nanostructures influenced the performance of the catalyst composite. The protective effect of the non-noble metal is through a cathodic corrosion protection mechanism.

30 Claims, 18 Drawing Sheets

(51) Int. Cl.
| | |
|---|---|
| B01J 23/50 | (2006.01) |
| B01J 23/52 | (2006.01) |
| B01J 23/745 | (2006.01) |
| B01J 23/75 | (2006.01) |
| B01J 37/00 | (2006.01) |
| B23H 3/04 | (2006.01) |
| B23H 5/10 | (2006.01) |
| B23H 7/22 | (2006.01) |
| C25B 1/00 | (2006.01) |
| C25B 3/00 | (2006.01) |
| C25B 11/00 | (2006.01) |
| C25C 1/00 | (2006.01) |
| C25C 3/00 | (2006.01) |
| C25C 7/02 | (2006.01) |
| C25D 1/04 | (2006.01) |
| C25D 5/10 | (2006.01) |
| C25D 17/10 | (2006.01) |
| C25F 7/00 | (2006.01) |
| B01J 35/00 | (2006.01) |
| B01J 21/06 | (2006.01) |
| B01J 23/89 | (2006.01) |
| B01J 35/06 | (2006.01) |
| B01J 35/10 | (2006.01) |
| B01J 37/34 | (2006.01) |
| H01M 14/00 | (2006.01) |
| B01J 37/02 | (2006.01) |

(52) U.S. Cl.
CPC .......... *B01J 23/8973* (2013.01); *B01J 35/0013* (2013.01); *B01J 35/06* (2013.01); *B01J 35/1066* (2013.01); *B01J 37/342* (2013.01); *B01J 37/348* (2013.01); *H01M 14/005* (2013.01); *B01J 37/0221* (2013.01); *C25B 1/003* (2013.01)

(56) References Cited

OTHER PUBLICATIONS

"Electrosynthesis of TiO2-Au composites for water splitting applications and their photoelectrical characterization," Jessy Elhajj et al. Chemical Engineering Master's Theses, Paper 4, 2008.*

"Heterogeneous Photocatalytic Preparation of Supported Catalysts, Photodeposition of Platinum on TiO2 Powder and Other Substrates," Bernhard Kraeutler et al. Journal of the American Chemical Society, 100, 13, (1978), pp. 4317-4318.*

"Electrodeposited Au/Fe/Au Nanowires with Controlled Porosity," S. Lucatero et al. Electrochemical and Solid-State Letters, 12 (2009), pp. D96-D100.*

"TiO2 Films Loaded with Silver Nanoparticles: Control of Multicolor Photochromic Behavior," Kenji Naoi, et al. J. Am. Chem. Soc. 2004, 126, pp. 3664-3668.*

"Multicolour photochromism of TiO2 films loaded with silver nanoparticles," Yoshihisa Ohko et al. Nature Materials, vol. 2 (Jan. 2003), pp. 29-31.*

"Influence of Metal/Metal Ion Concentration on the Photocatalytic Activity of TiO2-Au Composite Nanoparticles," Vaidyanathan Subramanian et al. Langmuir 2003, 19, pp. 469-474.*

\* cited by examiner

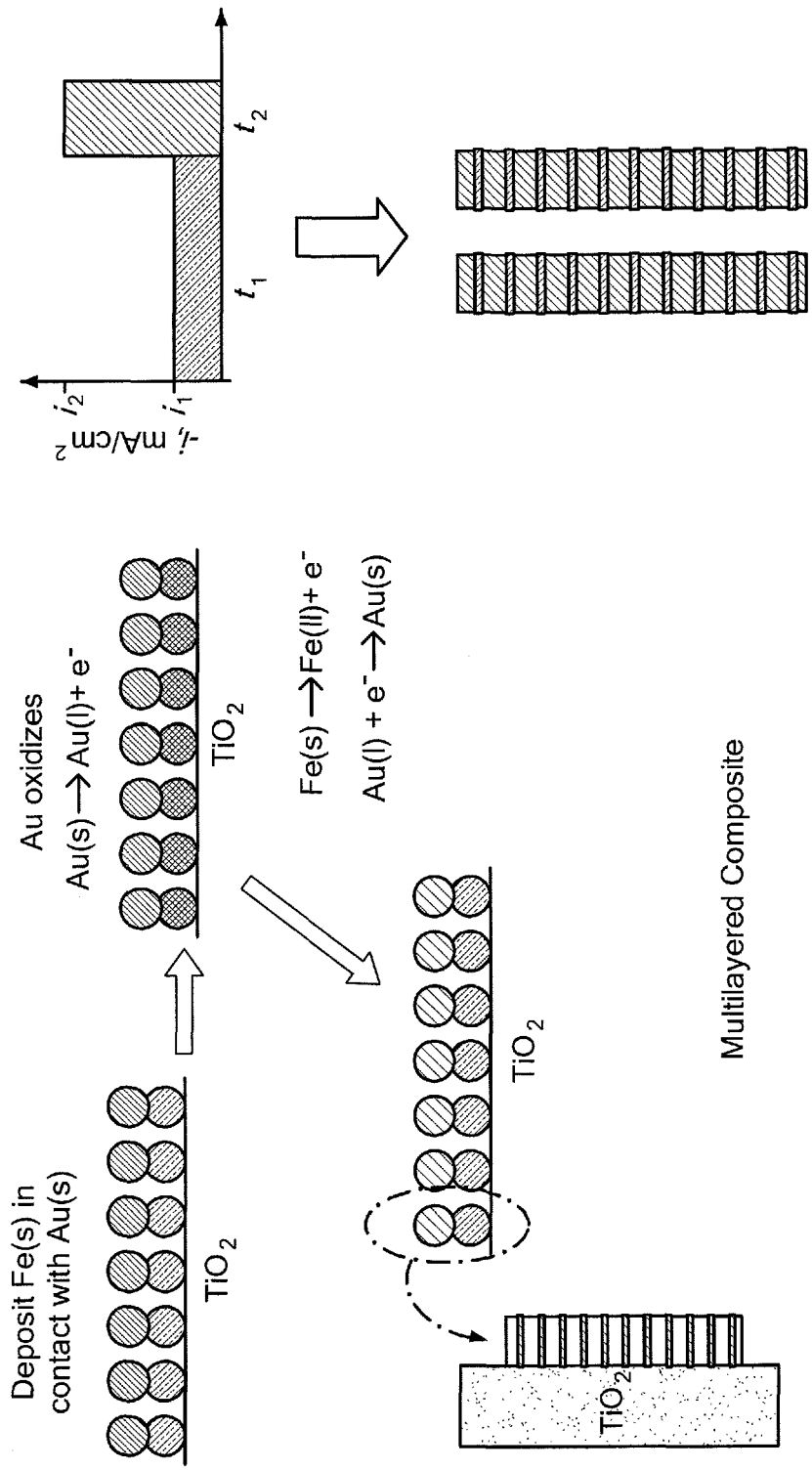

Au/FeAu multilayer nanowires

Au/FeAu multilayer nanowires

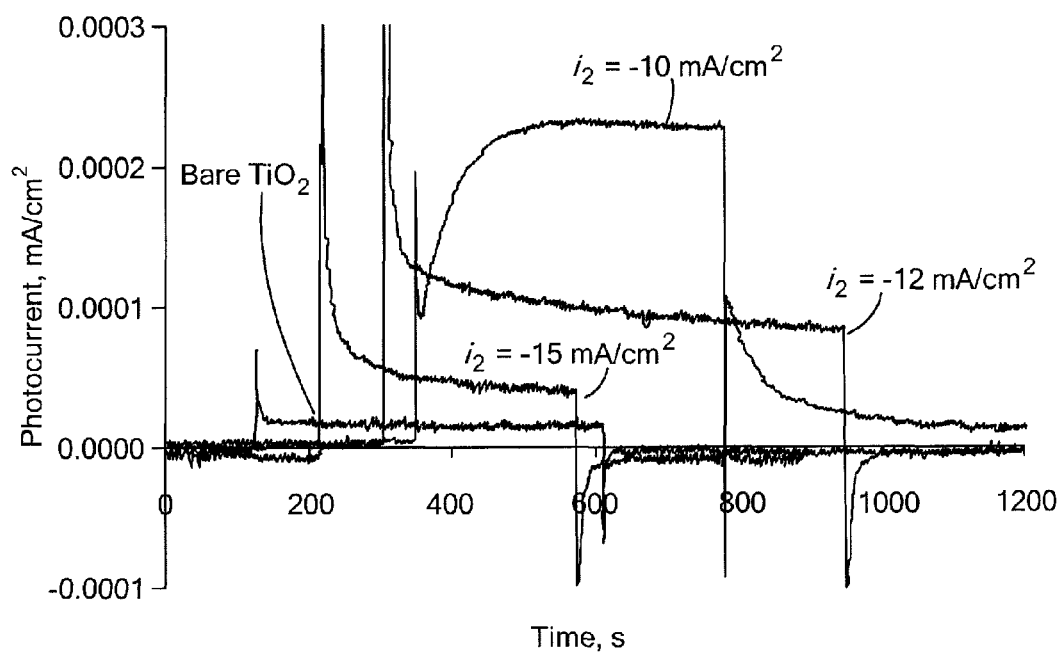
*FIG. 6A*
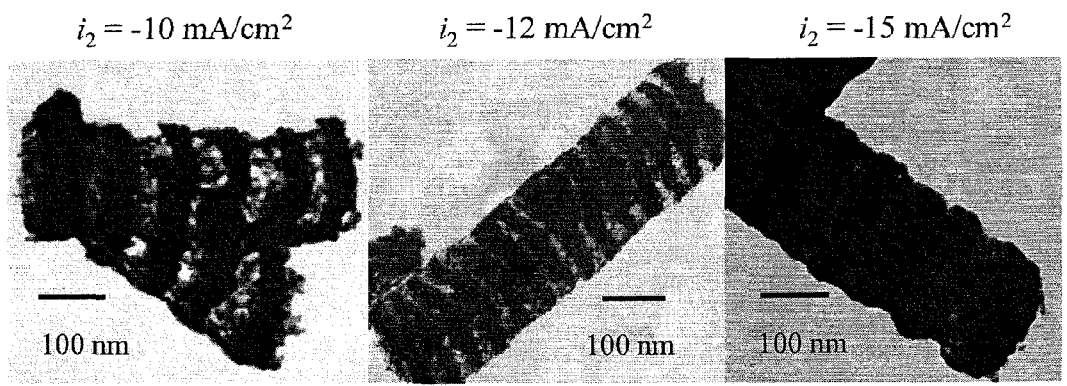
*FIG. 6B*   *FIG. 6C*   *FIG. 6D*

PHOTOCATALYST WITH ENHANCED STABILITY FOR HYDROGEN PRODUCTION AND OXIDATIVE REACTIONS

CROSS REFERENCE TO RELATED APPLICATIONS

This application claims the priority of U.S. Provisional Application No. 61/383,525 filed Sep. 16, 2010 and entitled, ELECTRODEPOSITED AuFeAu POROUS NANOWIRES FOR ENHANCED CATALYTIC ABILITY—AND STABILITY—OF REACTIONS ON TITANIA, the whole of which is hereby incorporated by reference.

STATEMENT REGARDING FEDERALLY SPONSORED RESEARCH

The research leading to this invention was carried out with U.S. Government support provided under a grant from the National Science Foundation, Grant No. CBET-0746567. The U.S. Government may have certain rights in the invention.

BACKGROUND

Environmentally clean hydrogen fuel presents a number of advantages over commonly utilized petroleum-based derivatives.[1-2] In particular, hydrogen can be generated by direct electrolysis of water upon irradiating a semiconductor material with light of energy greater than its energy band gap.[3-12] A strategy to improve the photocatalytic efficacy of bare semiconductors and improve the sluggish kinetics of the oxidation reaction has been the incorporation of noble metals onto the semiconductor surface.[13-24] The Au—$TiO_2$ system has been effective at enhancing and shifting the photoactivity to irradiation of longer wavelengths through relatively more efficient electron transfer processes involved in redox reactions.[25-31] The major drawbacks that limit the applicability of Au—$TiO_2$ composites are aging and/or deactivation effects arising from prolonged exposure to irradiating light.[32-35] Thus, there remains a need to develop photocatalysts that efficiently catalyze water splitting and other reactions with good long term stability under conditions of use.

SUMMARY OF THE INVENTION

The inventors have developed an approach to circumvent the rapid aging and deactivation effects of light on photocatalysts based on $TiO_2$ (titanium dioxide, titania) or other semiconductors to achieve long-lasting catalytic activity. The design involves the incorporation of a solid-state non-noble metal in galvanic contact with a noble metal that is in turn in galvanic contact with a semiconductor material. The non-noble metal induces in the noble metal a resistance to deactivation, owing to differences in nobility and in the electrochemical potential of the reactions involved. The preferential natural corrosion of the sacrificial, less noble metal serves as protection for the noble metal. Because the non-noble metal oxidizes first, it thereby protects the nobler metal from corrosion.

Thus, one aspect of the invention is a photocatalyst containing a $TiO_2$ material in surface contact with a plurality of nanostructures. The nanostructures contain a noble metal in galvanic contact with a non-noble metal, while the noble metal is in galvanic contact with the $TiO_2$ material and acts as an electron trap during a photocatalytic redox reaction. The non-noble metal maintains the noble metal in a reduced state and thereby preserves the activity of the catalyst.

Another aspect of the invention is a method of fabricating the photocatalyst just described. The method includes the steps of: (a) providing a $TiO_2$ material and a plurality of nanostructures that contain a noble metal in galvanic contact with a non-noble metal; and (b) depositing the nanostructures onto the surface of the $TiO_2$ material, such that the noble metal remains in galvanic contact with the $TiO_2$ material. In one embodiment of this method, the nanostructures are nanowires that are made by electrodepositing a first layer containing a noble metal and a second layer comprising a non-noble metal. The first and second layers are deposited into a nanowire template as alternating transverse layers, and the electrodeposition is from an ionic or nanoparticulate form of each metal.

Yet another aspect of the invention is a method of fabricating the photocatalyst described above. The method includes the steps of: (a) electrodepositing Au nanoparticles onto a $TiO_2$ material to create Au nuclei on the surface of the $TiO_2$ material; (b) electrodepositing Fe onto the Au nuclei by electrochemically reducing $Fe^{2+}$ from an electrolyte solution to form Au—Fe regions on the surface of the $TiO_2$ material; and optionally (c) electrodepositing Au onto the Au—Fe regions by electrochemically reducing $Au^+$ from an electrolyte solution to form an Au layer covering the Au—Fe regions.

Still another aspect of the invention is a method of fabricating the photocatalyst described above. The method includes the steps of: (a) electrodepositing Fe nanoparticles onto a $TiO_2$ material to create Fe nuclei on the surface of the $TiO_2$ material; and (b) depositing Au onto the Fe nuclei by chemically displacing some of the Fe of the Fe nuclei with $Au^+$ or $Au^{3+}$ ions from solution to form Au—Fe regions on the surface of the $TiO_2$ material.

Another aspect of the invention is a method of producing hydrogen gas by photocatalytic electrolysis. The method includes irradiating an aqueous electrolyte solution with light in an electrolytic cell having an anode and a cathode. The anode includes the photocatalyst described above. A voltage is produced between the anode and the cathode, and water molecules are split to form hydrogen and oxygen.

Yet another aspect of the invention is a method of oxidizing an organic compound by photocatalytic oxidation. The method includes irradiating the compound with light in an electrolytic cell having an anode and a cathode, wherein the anode contains the photocatalyst described above. A voltage is produced between the anode and the cathode, and the organic compound is oxidized.

BRIEF DESCRIPTION OF THE DRAWINGS

FIG. 3 is a diagram depicting the contact and interaction between Au and Fe atoms in a catalyst composite particle of the invention.

FIG. 4 is a diagram of an electrodeposition process for preparing multilayered nanostructures having alternating layers of a noble metal and an alloy of a noble metal with a non-noble metal.

FIG. 6A shows the photocurrents generated by a pulse of UV light for catalyst composites produced by electrodeposition of the Fe—Au alloy at the indicated current densities ($i_2$=−10, −12, and −15 mA/cm$^2$; $t_2$=25 s for all). Also shown for comparison is the photocurrent obtained for bare titania catalyst, having no Au/Fe—Au multilayered nanostructures. FIGS. 6B-6D show transmission electron micrographs corresponding to the three current density conditions represented in FIG. 6A. Differences can be seen in the electron density of the Fe—Au layers as a function of the electrodeposition current density.

DETAILED DESCRIPTION OF THE INVENTION

The invention provides a novel, long-lasting catalyst for carrying out light-assisted electrochemical reactions. The catalyst is a composite material based on a semiconductor material, such as titania (also referred to as titanium dioxide or $TiO_2$), which forms holes and activated electrons upon the absorption of light of appropriate wavelength. The activated electrons can be used to drive an electrochemical reaction, such as the splitting of water in a process for producing hydrogen for use as a fuel, or the oxidation of organic compounds to remove pollutants in a water source. The composite includes a noble metal that serves as a trap for excited electrons produced by the irradiated titania. The composite further includes a less noble (i.e., non-noble)) metal that in turn can supply electrons to the noble metal and maintain it in a reduced state during operation in an electrochemical cell. The composition and structure of the catalyst composite material render it highly active and exceptionally stable in use, whereas previous catalysts have shown a very short useful lifetime, rapidly losing their catalytic activity.

Figure 1A:
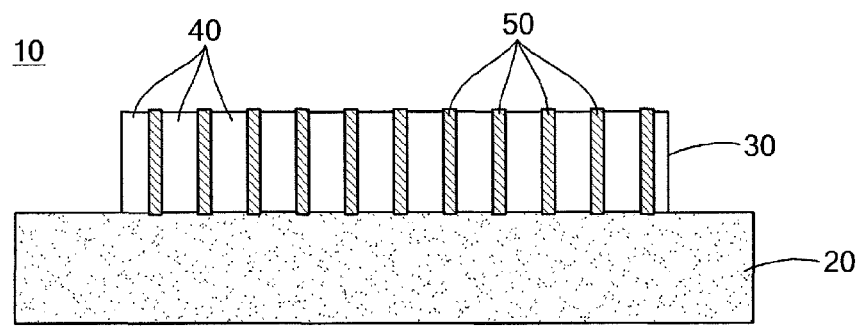
FIG. 1A is a diagram of an embodiment of a catalyst composite according to the invention, showing the interface between a $TiO_2$ material and a multilayered nanostructure containing alternating layers of noble metal and an alloy of a noble metal and a non-noble metal.
Figure 1B:
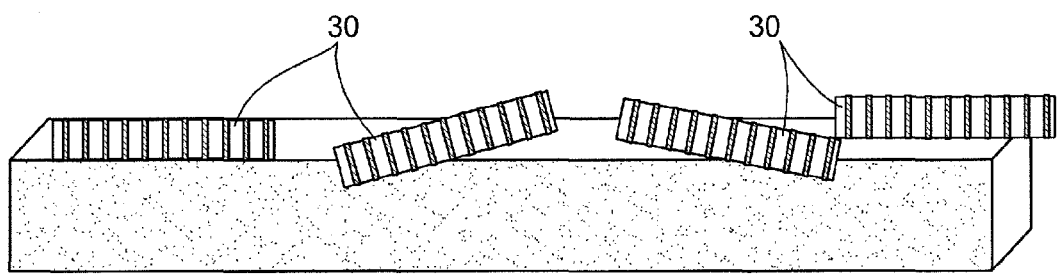
FIG. 1B is a diagram of an embodiment in which multiple nanowire structures are associated with each particle of the $TiO_2$ material.

A photocatalyst according to the invention is a composite material that includes a semiconductor material with bound nanostructures that contain both noble and non-noble metals. See FIG. 1A, which depicts an embodiment of a catalyst composite particle. Catalyst composite particle 10 generally consists of semiconductor material 20 having a plurality of nanostructures 30 bound to its surface.

The preferred semiconductor material is titania, which has excellent catalytic properties for promoting water splitting and an appropriate band gap to utilize the energy of sunlight or other forms of visible or ultraviolet light. Alternatives to titania include SiC, III-nitrides such as GaN, and forms of titania that are doped with other elements.[55] The titania material is a solid material that contains $TiO_2$, either in pure form or alloyed with other elements; preferably the titania material is essentially pure $TiO_2$. The titania material generally forms the greater part of the mass of the composite, and can take the form of solid particles, crystals, or other shapes that preferably have a high surface area to volume ratio so as to optimize catalyst activity. Preferably, the titania material contains or consists of crystalline $TiO_2$ in the anatase or rutile form, though other forms may be used as well. The size of the particles can be in the microscale range (about 1 to about 1000 µm) or in the nanoscale range (about 1 to about 999 nm), or can overlap with both ranges. Catalyst particles optionally can be attached to a solid support, such as a planar substrate, the surface of a reaction vessel, or porous or non-porous carrier particles of various shapes. Examples of suitable planar substrate materials are stainless steel, indium tin oxide, copper, nickel, and copper-nickel alloys.

The nanostructures contain noble metal 40 and alloy 50, each of which is formed into one or more separate regions or layers of the nanostructure. The noble metal is preferably exposed at the surface of the nanostructures, where it can form galvanic contact with the titania material for the transfer of electrons from titania to the noble metal. See FIG. 3. The alloy includes both a noble metal and a non-noble metal, which is a metal that is less noble than the noble metal and has a suitable redox potential that enables it to act as a sacrificial oxidant, preferentially itself oxidizing prior to oxidation of the noble metal, and in turn reducing an oxidized form of the noble metal. In the alloy, the ratio of noble metal to non-noble metal is less than 1:1, such that the noble metal makes up less than 50% by weight of the alloy. The noble metal region of the nanostructure can also be an alloy, but it preferably contains less than 10% non-noble metal by weight. The noble and non-noble metals are both in solid form and in galvanic contact with each other, so that electrons can be exchanged between them. Two portions of a nanostructure or of a catalyst composite are in galvanic contact if charge carrying particles such as electrons can move between the portions through the region of contact. Preferred noble metals are Au, Ag, Pt, and combinations thereof. When a mixture of noble metals is used (e.g., Au:Ag), the different noble metals can be alloyed in the range of 1:9 to 9:1, where the first number of the ratio refers to the Au content on a weight basis. Preferred non-noble metals are Fe, Co, and mixtures thereof. In the noble-non-noble alloy, the ratio of different non-noble metals to each other (e.g., Fe:Co ratio) can be in the range from about 1 to 99 to about 99 to 1, where the first number refers to the Fe content by weight. As will be shown in the examples below, too high a density in the non-noble metal alloy region of the nanostructures should be avoided, as excess density decreases the porosity as well as the photocatalytic activity and photocurrent produced.

The nanostructures can have any form and size consistent with their function and providing galvanic contact between the noble metal and the titania as well as between the noble and non-noble metals. For example, the nanostructures can be in the form of nanoparticles, nanowires, nanoclusters, or nanocrystals, or combinations thereof. Preferably the nanostructures are of nanoscale dimensions, but they can also be of microscale dimensions, or have dimensions in both nanoscale and microscale realms.

A preferred form of the nanostructures is that of nanowires, which have a high surface area to volume ratio and bind readily to titania crystals, forming an appropriate galvanic contact between the noble metal and the titania. Methods for fabricating nanowires are known in the art. For example, as exemplified below, nanowires can be made by electrochemical or electrophoretic deposition of metal ions from aqueous solution into a suitable template. See FIG. 4. A track-etched polycarbonate membrane is one suitable template, but any template can be formed using lithography techniques, such as photolithography, electron beam lithography, or ion beam lithography and a suitable polymer material. After formation of nanowires, the template can be dissolved using solvents, leaving a suspension of nanowires. A similar strategy can be used for nanostructures of other geometries.

A plurality (i.e., two or more) of the nanostructures are deposited onto the surface of each particle of titania material; however, the nanostructures generally should not cover more than 25% (and in some embodiments not more than 5%, 10%, or 15%) of the surface of the titania material. This is so that sufficient free surface of the titania is exposed to light to allow for efficient uptake of light energy to drive the photoreaction. The nanostructures in a given preparation of catalyst or on an individual catalyst particle can all be of the same type or can be of mixed types with regard to composition and/or morphology. The nanostructures can be present on the surface of the titania material either in clusters or homogeneously distributed over the surface. Though the nanostructures have surface contact with the titania material, it is not required that all of a given nanostructure has surface contact with the titania, or even that every nanostructure has surface contact with titania, but merely that there is enough surface contact for the effective transfer of electrons from the titania to noble metal in the nanostructures.

In the case where Au is used as the noble metal and Fe is used as the non-noble metal, the following reaction scheme is believed to underlie the protective mechanism:

$$Fe(s) \text{---} > Fe^{2+} + 2e^- \quad (1)$$

$$Au^{3+} + 2e^- \text{---} > Au \quad (2)$$

The respective electrochemical potentials for these reactions are −0.440 V for reaction (1) and +1.498 for reaction (2) versus a standard hydrogen electrode.[36] Thus, when combined into a single system, Fe has the ability to reduce any oxidized $Au^{3+}$ ions back to their metallic form. $Au$—$TiO_2$ material doped with the $Fe^{2+}/Fe^{3+}$ redox couple has been shown to induce Au reactivation.[42] In addition to driving the reduction of the nobler metal at the expense of its own oxidation, when Fe is oxidized as part of the protection scheme, an iron oxide product can contribute to directly enhancing photoelectrochemical reactions. Iron oxide is a low band gap material that enables 40% sunlight absorption, but also has undesirable limitations such as its poor conductivity, leading to high recombination rates and low kinetics for water oxidation.[38-41]

In the present invention, a non-noble metal such as Fe is incorporated in solid form, offering the convenience of having the catalyst entirely in a single solid phase, which would not be the case when using an $Fe^{2+}/Fe^{3+}$ redox couple. According to the invention, a solid non-noble metal (e.g., Fe(s)) is tailored in galvanic contact to a solid form of a noble metal (e.g., Au(s)) in the form of nanostructures which are bound to the surface of a titania material. For example, multilayered nanowires or other nanostructures can be fabricated electrochemically by means of a square-wave pulsed current scheme from a cyanide-free electrolyte.[43-44] See FIG. 4. Variations in porosity and non-noble metal content of the alloy layer can be controlled via the deposition conditions[43] and the type of complexant species present in the electrolyte.

The nanostructures include two or more types of separate but adjacent domains or regions, which can be arranged, for example, into stacked layers or clusters of domains such as crystallites. One of these domains contains noble metal, either essentially pure or as an alloy with a small amount of non-noble metal, and another domain contains an alloy of non-noble metal with noble metal. Preferably, the noble metal in the non-noble alloy domain is the same as that in the noble metal domain. Where nanowires are used as the nanostructures, a convenient arrangement is a multilayered stacked structure, in which alternating flat discs or cylinders of noble metal domain and non-noble/noble alloy domain are deposited along the length of the nanowire. Preferably, the thickness of the non-noble/noble alloy domains is less than or equal to the thickness of the noble metal domains. This is because an excess of a non-noble metal, such as Fe, leads to deleterious photoactivity with loss of catalytic activity. The thickness and geometry of the respective noble metal and non-noble alloy portions of the nanostructure can be varied as desired, provided that good galvanic contact between these portions is maintained.

The fabricated nanostructures can be subsequently deposited onto a $TiO_2$ or other semiconductor material to form a composite. For example, a suspension of nanostructures in ethanol can be deposited onto the surface of a titania material, and the solvent allowed to evaporate. Unattached nanostructures can be washed off the titania with further solvent (e.g., ethanol).

The use of prefabricated nanostructure material can also be avoided using an alternative method of making the catalyst composition. When prefabricated nanostructures such as templated Au/FeAu nanoparticles or nanowires are prepared and then transferred onto $TiO_2$ material, the additional templating process and transfer steps require additional processing steps, time, and equipment. These steps can be avoided by depositing nanoparticles containing noble and non-noble metals directly onto $TiO_2$ without using a template. Two variations of this direct deposition approach are described below.

Figure 1C:
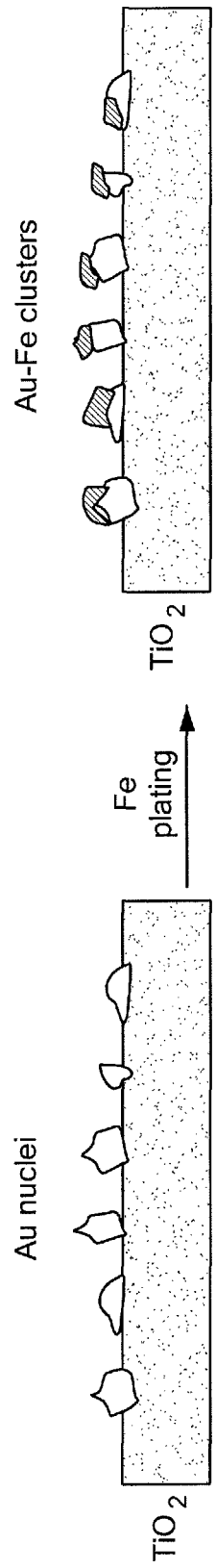
FIG. 1C depicts an embodiment in which Au nuclei are deposited on a $TiO_2$ surface, and Fe is in then plated onto the Au nuclei.

The first direct deposition method involves utilizing changes in resistance. First, nuclei of a noble metal are electrodeposited onto the surface of a titania material. For example, Au can be nucleated onto $TiO_2$ via an electrodeposition process.[51, 52] A brief deposition pulse is applied using either an applied current or potential. The titania is used as the anode, and the noble metal is deposited as solid nanoparticles, rather than ions. Au nuclei then form on the $TiO_2$ surface. For example, Au can be electrodeposited from a commercially available gold solution (TG-25E RTU, ~0.04 M), supplied by Technic Inc., using a dual step pulse at −12.2 mA/cm² for 25 ms, (nucleation step) and −3.7 mA/cm² for 350 ms (growth step). Second, the nuclei of noble metal are coated with a layer of non-noble metal by a further electrodeposition step. See FIG. 1C. During this second step, electrodeposition occurs selectively onto the noble metal nuclei because the nuclei provide a low resistance pathway for current flow. For example, Fe can be reduced from an Fe(II) electrolyte, and the Fe will be deposited onto the Au nuclei on an Au—$TiO_2$ composite because the Au nuclei form the lowest resistance pathway. Deposition conditions should be adjusted so as to avoid Fe deposition directly onto the $TiO_2$ surface, where it would be ineffective as a sacrificial oxidant. Optionally, another layer of Au(I) can be deposited onto the Au/Fe layer.

Figure 1D:
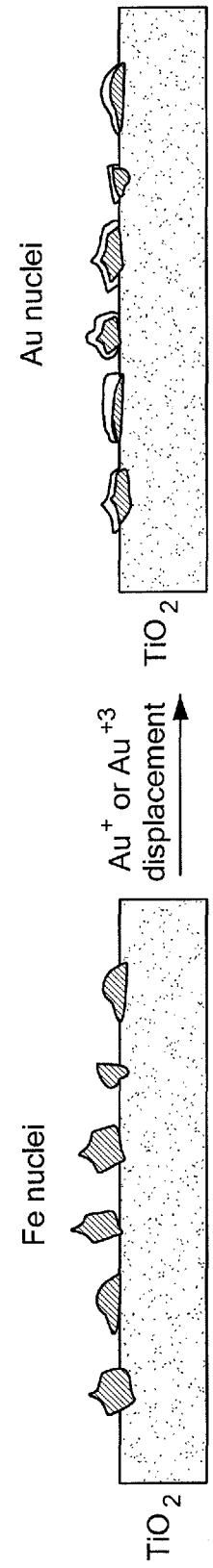
FIG. 1D shows an embodiment in which Fe nuclei are deposited onto a $TiO_2$ surface, and then Au ions react with and displace Fe to coat the nuclei with an Au layer.
Figure 2A:
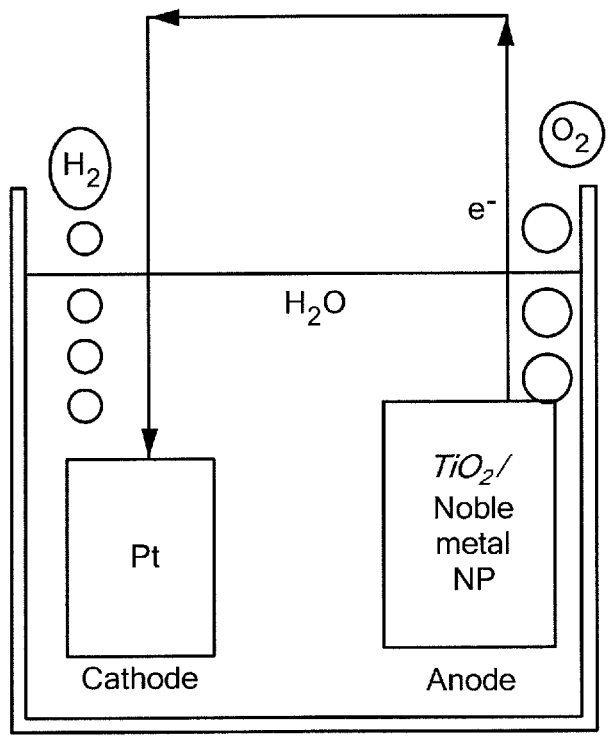
FIG. 2A is a diagram of a photocatalytic electrolysis system in which the photocatalyst of the invention is utilized at the anode. The diagram depicts the electrochemical process operating in the system, in which water is split to form hydrogen gas at the cathode and oxygen gas at the anode.
Figure 2B:
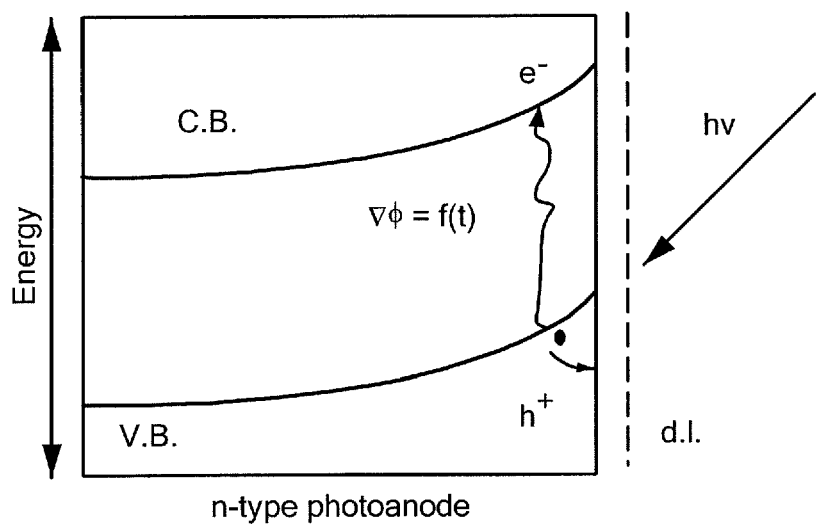
FIG. 2B is a diagram of the electron energy bands (valence band (V.B.) and conductance band (C.B.)) at an n-type photoanode such as that shown in FIG. 2A.

The second direct deposition method utilizes chemical displacement. The chemical displacement reaction requires no external current supply, but relies instead upon differences between the equilibrium potentials of reactions that are thermodynamically favorable. For example, a layer of Fe nuclei can be first electrodeposited onto $TiO_2$, and subsequently the Fe nuclei can be partially displaced by Au from a Au(I) or Au(III) solution. See FIG. 1D. Because Fe(s) can provide the electrons for the Au reduction reaction (without any light irradiation), the Au will be directed to the Fe nuclei. The reactions are as follows:

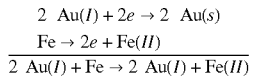

Since this is a surface reaction, it is inherently self-limiting and contact between Fe—Au—$TiO_2$ is ensured. Any appropriate noble and non-noble metals can be selected, provided they have the appropriate electrochemical potentials for the displacement reaction to occur spontaneously. It can be important to use appropriate pH values in the electrolyte solutions. For example, an electrolyte solution containing Au(I) or Au(III) ions should have a pH value in a region where Fe oxides are not stable. From a Pourbaix diagram, their pH should be less than 9.[53] Many commercial Au electrolytes are basic and would stabilize these Fe oxides. Au-citric acid electrolytes can be useful in this regard.[54]

A key feature of the catalyst composites of the invention is their long term stability under conditions of use. Previous semiconductor photocatalysts using noble metals such as gold as an electron trap were subject to degradation of the noble metal by oxidation and rapid loss of catalytic activity over a period of days to weeks in use. However, the present invention has overcome this disadvantage and provides a catalyst material that remains nearly fully functional for several months under continuous use. For example, using an accelerated aging test in which the catalyst is illuminated with UV light continuously, a photocatalyst of the invention should produce a photocurrent that remains stable for at least about 180 days. The UV source, such as a light emitting diode with monochromatic emission of 365 nm, preferably has an intensity of 30 W/m². Test pulses should be long enough (e.g., 300-600 s) to measure steady state photocurrent. The photocurrent is considered to remain stable if a steady state photocurrent in response to a step pulse of UV light shows no more than 10% reduction over a period of continuous UV illumination. In particular, the stability of the catalyst composite of the present invention is believed to result from the inclusion of a sacrificial non-noble metal. Therefore, comparison testing of similar catalysts differing only by the presence or absence of the non-noble metal in the nanostructures is expected to reveal that adding the non-noble metal extends the stability of the catalyst to at least 180 days under a continuous UV aging protocol as described above. While a stability of at least 180 days is achieved under conditions of accelerated testing, longer stability is expected under conditions of use with visible light, or mixtures of visible light and UV light, e.g., sunlight, as visible light is less damaging to the noble metal component of the catalyst.

The catalysts of the invention can be used to catalyze a variety of chemical reactions, including reactions useful to generate hydrogen fuel (water reduction reaction, or water splitting) and oxidation reactions for organic compounds. The ability of the catalyst to promote oxidation of organic compounds is useful to purify contaminants in a water source and to destroy pollutants such as spilled crude oil or other organic pollutants.

The photocatalytic potential for the water reduction reaction and for other reactions can be assessed by means of a step in illumination, cyclic voltammetry, and impedance modulated photocurrent spectroscopy (IMPS). The efficacy of the non-noble metal at preventing catalyst deactivation, as well as the effects of variations in composition and structure of the composite can also be assessed using the same assays. A theoretical discussion of the kinetics of photogenerated holes for an n-type semiconductor as well as the physical interpretation of the IMPS response in the complex plane can be found in the literature.[45-47] The AC component of the photocurrent as a function of frequency in the complex plane is given by the following.[47]

$$j(w) = Io \frac{k_{et} + i\omega(C/C_{sc})}{k_{et} + k_{rec} + i\omega} \times \frac{1}{1 + i\omega RC}$$

$$C = \frac{C_{sc} C_n}{C_{sc} + C_n}$$

Among other assumptions therein, the photogenerated minority carriers (holes, $h^+$) are considered to transfer into the electrolyte with a rate constant $k_{et}$, or to be consumed by recombination with a rate constant $k_{rec}$, with both processes proportional to the minority carrier concentration at the electrode surface. $C_H$ and $C_{sc}$ are respectively the Helmholtz and space charge capacitances, RC is the time constant of the electrochemical cell, $I_o$ is the amplitude of the photogenerated hole current towards the surface, ω is the light modulation frequency, and j is the current through the external circuit by illumination.[47] In the particular cases of almost complete or partial recombination, a typical IMPS plot exhibits two semicircles located in the first and fourth quadrants of the plane.[45-47] The intersection of the low frequency limit with the real axis equals $j(w)_{\omega \to 0} = I_o k_{et}/(k_{et}+k_{rec})$, and the maximum of the frequency is $\omega_{max} = k_{et}+k_{rec}$.

The recombination time constant, τ, can be extracted from the maximum of the frequency according to $\omega_{max} = \frac{1}{2} \pi \tau$[47] and the right-hand side intersection of the semicircle with the real axis, $I_o C_H/(C_{sc}+C_H)$, has been defined proportional to the flux of minority carriers to the electrode surface.[45-47]

EXAMPLES

Example 1

Synthesis of Au/FeAu Nanowires

Nanowires were deposited within track-etched polycarbonate (PC) membranes (6 μm thick and 100 nm pore diameter, Osmonics). The nanowires were fabricated by pulsing current between two cathodic potentials, resulting in Au/FeAu multilayered structures. The noble metal layer was developed at $i_1 = -0.9$ mA/cm² ($t_1 = 135$ s), whereas the deposition time, $t_2$, and current density, $i_2$, for the FeAu layer were varied. The cathode consisted of the PC membrane sputtered on one side with Au and placed inside a poly ether ether ketone (PEEK) holder; an Au anode was aligned horizontally (i.e., parallel) to the membrane and a saturated calomel reference electrode was used. Multilayers were deposited without agitation. The nanowires were released from the templates by soaking in a dichloromethane bath for 12 hours. Solvent removal was achieved by repeated dilution with high purity ethanol followed by centrifugation. The electrolyte for Au/FeAu nanowire synthesis contained: 1) citric acid, 0.49 M; 2) FeSO₄, 0.29 M; 3) KOH, 1.07 M; and 4) 2.5 mM Au (Techni® Gold 25 E). The pH was adjusted to 6.15 with diluted H₂SO₄ or KOH at room temperature, and deionized ultrafiltered (DIUF) water (Fisher Scientific) was utilized for all experiments. Quantitative compositional analysis of the deposits and nanowires was conducted by X-ray fluorescence (XRF) spectroscopy operating at 45 keV, 2 mA in air with a 100 μm collimator. Transmission electron microscopy (TEM) was used to characterize the multilayer nanowires; approximately 20 μL of the concentrated nanowire suspension were placed in a Cu/carbon-coated transmission electron microscopy (TEM) grid and visualized under a JEOL 1010 TE microscope operating at an accelerating voltage of 60 kV in bright field. Scanning electron microscopy (SEM) images were taken with aid of a Hitachi S4800 field emission SE microscope operated at 3.0 kV.

Example 2

Synthesis of a TiO₂/Au/FeAu Catalyst Composite

Synthesis of a catalyst composite was carried out by first performing a potentiostatic electrosynthesis of semiconducting TiO₂ and subsequently incorporating Au/FeAu multilayer nanowires onto the semiconductor surface. The nanowires were made as described in Example 1. A fixed aliquot (200 μL) containing a known amount of nanowires (about 10⁷) suspended in ethanol was dropped onto the TiO₂ film, and the solvent was allowed to evaporate. The electrochemical set-up used for the synthesis of TiO₂ consisted of a Cu cathode, a Au anode, a reference saturated calomel electrode (SCE), and an electrolyte prepared according to Georgieva et al.[48] having the following composition: 0.02 M TiOSO₄, 0.03 M H₂O₂, 0.05 M HNO₃ and 0.05-0.25 M KNO₃, having a pH of 1.4. Three consecutive layers of TiO₂ were deposited for one hour on medical grade stainless steel at a fixed potential of −1.5 V versus SCE. Immediately after each deposition step, the sample was dried in air at 150° C. for one hour, and it was finally annealed at 400° C. to obtain the crystalline anatase form of TiO₂.[48]

Example 3

Assay for Photocatalytic Activity

The catalytic performance of catalyst composite materials was assessed for the water reduction reaction using aqueous solutions of NaOH (0.05 M) and utilizing a photoelectrochemical cell with a quartz window. The Au—Fe/TiO₂ composite sitting on the stainless steel substrate was the working electrode (WE); a platinum mesh was the counterelectrode (CE), and an Ag/AgCl electrode was used as a reference electrode (RE). The working electrode was positioned perpendicular to the incident light generated by a 10 W low-pressure Hg lamp, and the CE and RE were kept out of the irradiation. UV light with a wavelength of 365 nm was irradiated from a source consisting of an emitting diode. For IMPS experiments, a sinusoidal modulation of the incident light was controlled directly from the potentiostat software (Zahner IMPS system, Germany) to which the lamp was connected.

Example 4

Nanostructure of a TiO₂/Au/FeAu Catalyst Composite

Figure 5A:
FIG. 5A shows a scanning electron micrograph of an electrodeposited $TiO_2$ crystalline anatase film.
Figure 5B:
FIGS. 5B-5D show scanning electron micrographs of $TiO_2$—Au—Fe—Au catalyst composite particles at varying magnifications.
Figure 5C:
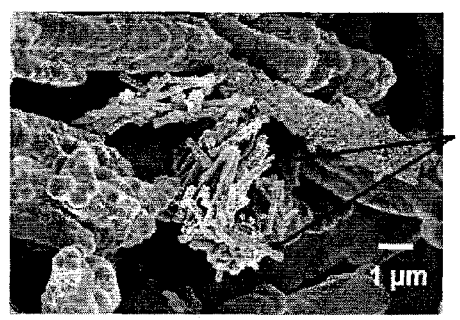
Figure 5D:
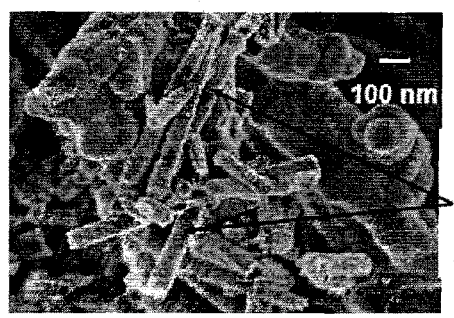
Figure 7A:
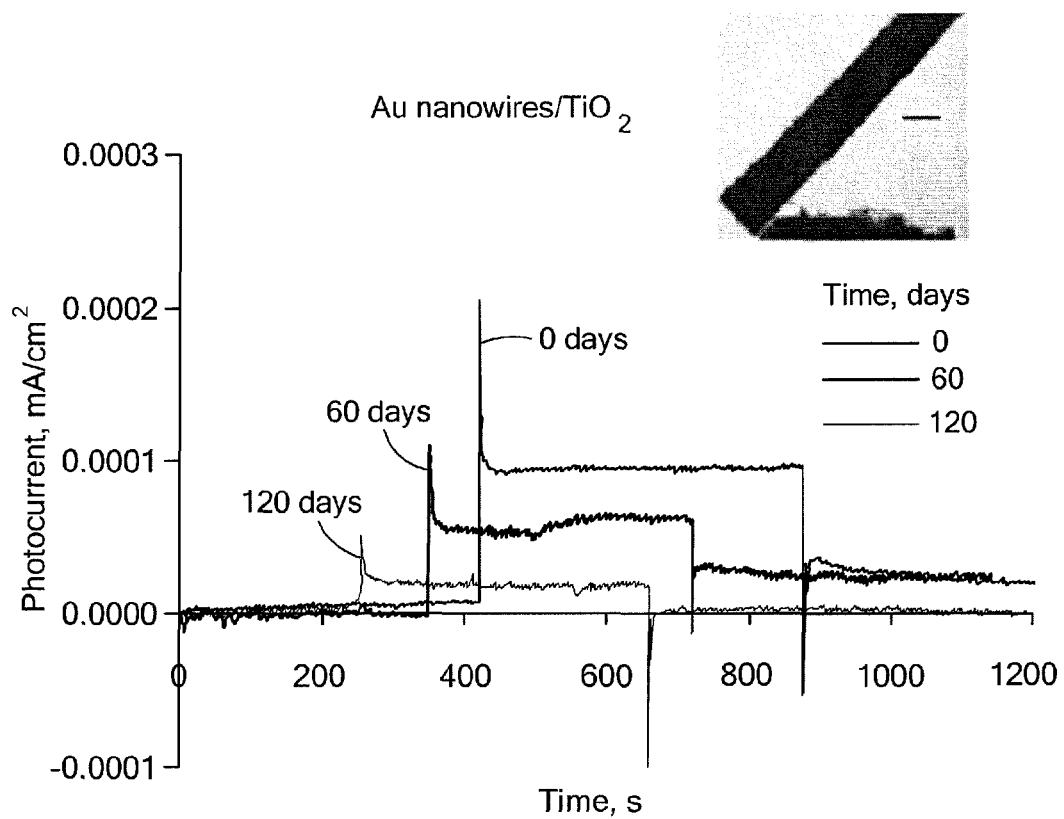
FIG. 7A shows the photocurrents generated by a pulse of UV light for a composite of titania and Au nanowires, as a function of the age of the composite. The observed photocurrent was found to decrease from 0 to 60 and further to 120 days.
Figure 7B:
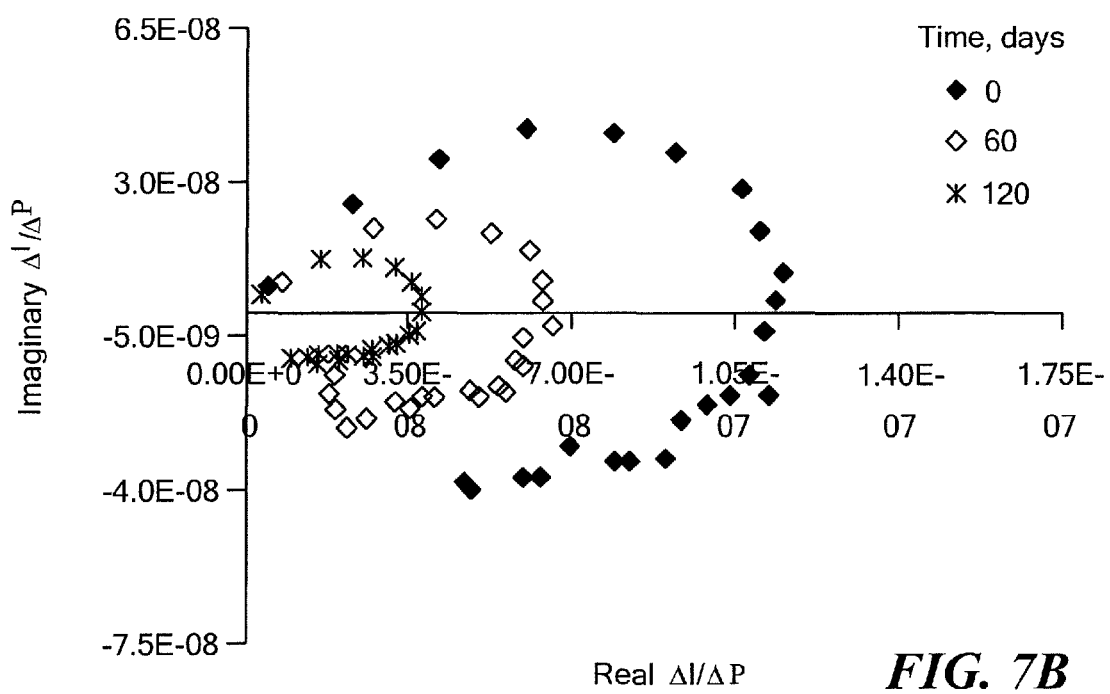
FIG. 7B shows the impedance modulated photocurrent spectroscopy (IMPS) data corresponding to the photocurrent experiments shown in FIG. 7A.
Figure 7C:
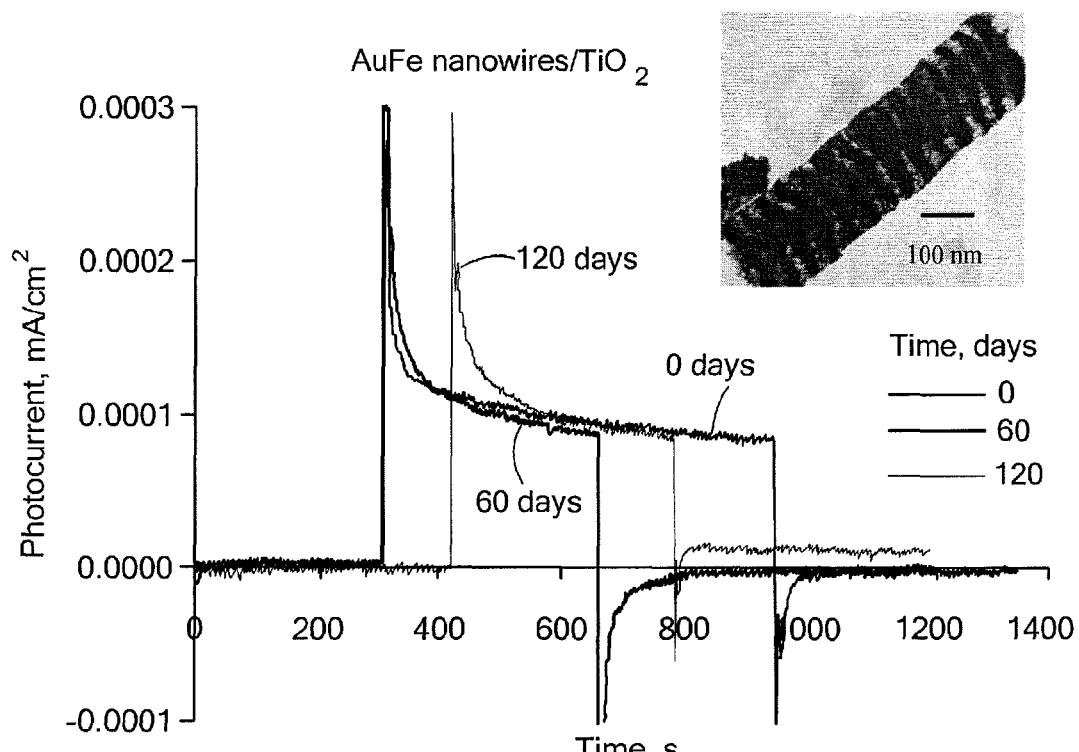
FIG. 7C shows the photocurrents generated by a pulse of UV light for a composite of titania and Au/Fe—Au nanowires, as a function of the age of the composite. The observed photocurrent was observed to remain stable from 0 to 60 and also to 120 days.
Figure 7D:
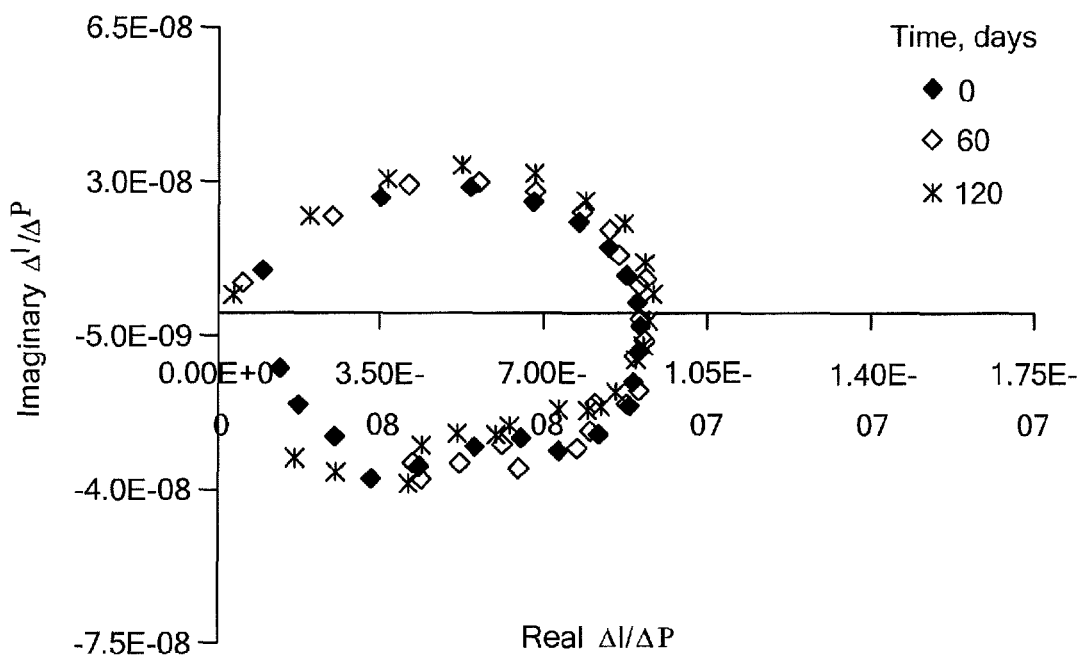
FIG. 7D shows the impedance modulated photocurrent spectroscopy (IMPS) data corresponding to the photocurrent experiments shown in FIG. 7C.

TiO₂ and Au/FeAu nanowires fabricated by electrodeposition were combined together to form a composite catalyst as described in Example 2. FIG. 5A is an SEM image of a bare TiO₂ film electrosynthesized according to the procedure described in Example 2. It shows a needle-like morphology and high surface area. FIGS. 5B-D are images of the composite catalyst illustrating the multilayered nanowires lying down over the TiO₂ surface and in contact with it; their distinct Au and FeAu segments are apparent.

Example 5

Photocatalytic Activity of TiO₂ Catalyst and TiO₂/Au/FeAu Catalyst Composite

Figure 8A:
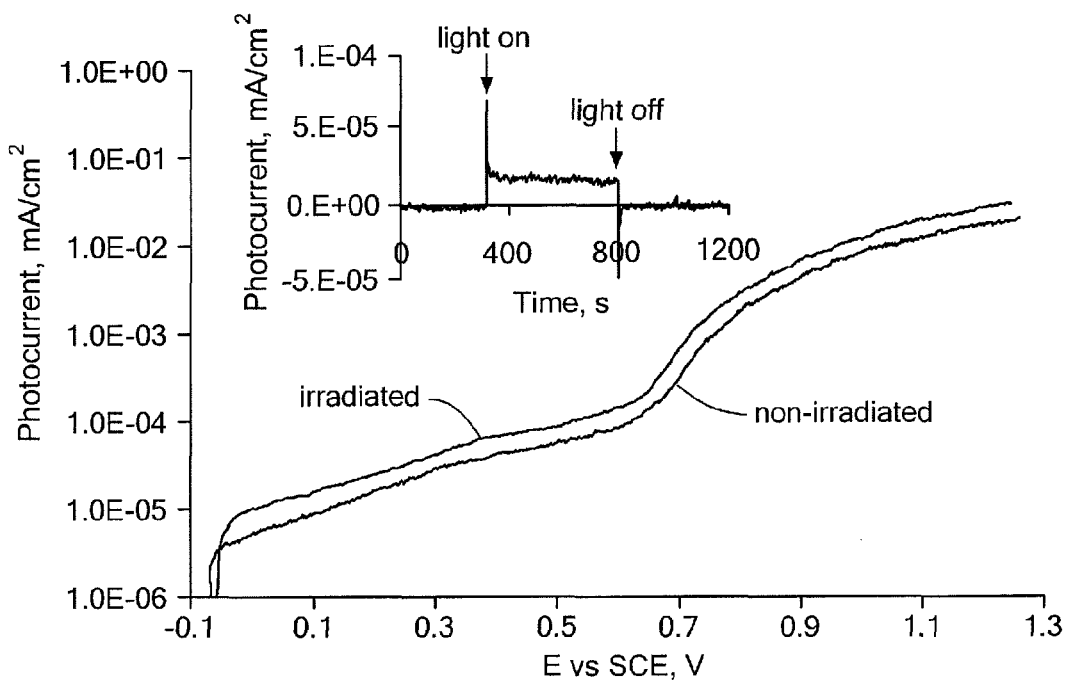
FIG. 8A shows the anodic polarization behavior of bare titania catalyst in the presence and absence of UV irradiation. The inset shows the photocurrent resulting from a single light pulse.

FIG. 8A shows the anodic polarization behavior of a freshly electrodeposited TiO₂ thin film made by the method described in Example 2. The scan rate was 5 mV/s, and the catalyst was either exposed to UV light (365 nm) or kept in the dark. In the entire range of potential screened, i.e., from −0.1 to 1.3 V vs SCE, the photogenerated current was higher under illumination conditions than in the absence of light. At open circuit potential conditions (OCP, −0.054 V versus SCE) the enhancement in the reaction rate (photocurrent) observed in the polarization curves upon irradiation was consistent with the photocurrent generated with a step in illumination shown in the inset.

Figure 8B:
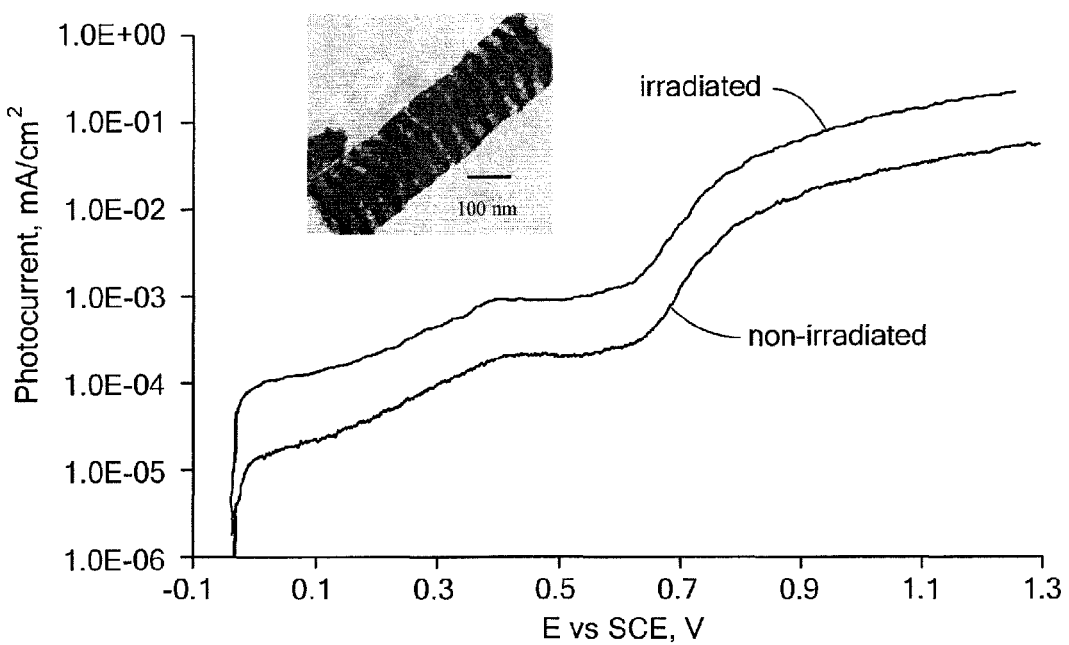
FIG. 8B shows comparable behavior for a catalyst composite containing titania associated with Au/Fe—Au nanowires. The inset shows a transmission electron micrograph of one of the Au/Fe—Au nanowires.

FIG. 8B illustrates the polarization behavior of $TiO_2$ integrated with nanowires fabricated as described in Example 1 using $i_1=-0.9$ mA/cm$^2$ ($t_1=135$ s) and $i_2=-12$ mA/cm$^2$ ($t_2=25$ s) for the Au and AuFe layers, respectively (inset shows a TEM image of a nanowire). Comparing the polarization curves for the irradiated versus the non-irradiated catalyst composite, it was observed that the photocurrent was significantly higher in the former case, in the range of potentials screened. In this particular composite, and under illumination conditions, the incorporation of Au/FeAu nanowires onto $TiO_2$ improved the photogenerated current by about an order of magnitude relative to the bare $TiO_2$ semiconductor in the range of −0.1 and 1.3 V versus SCE.

Figure 9A:
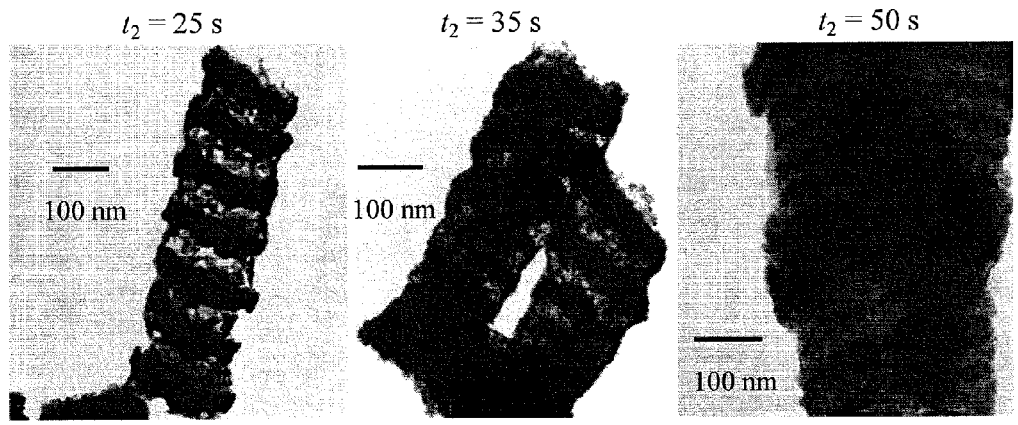
FIG. 9A shows the morphology by transmission electron microscopy of Au/Fe—Au nanowires as a function of the time ($t_2$, see FIG. 4) of electrodeposition of the Fe—Au alloy layer of the nanowires.
Figure 9B:
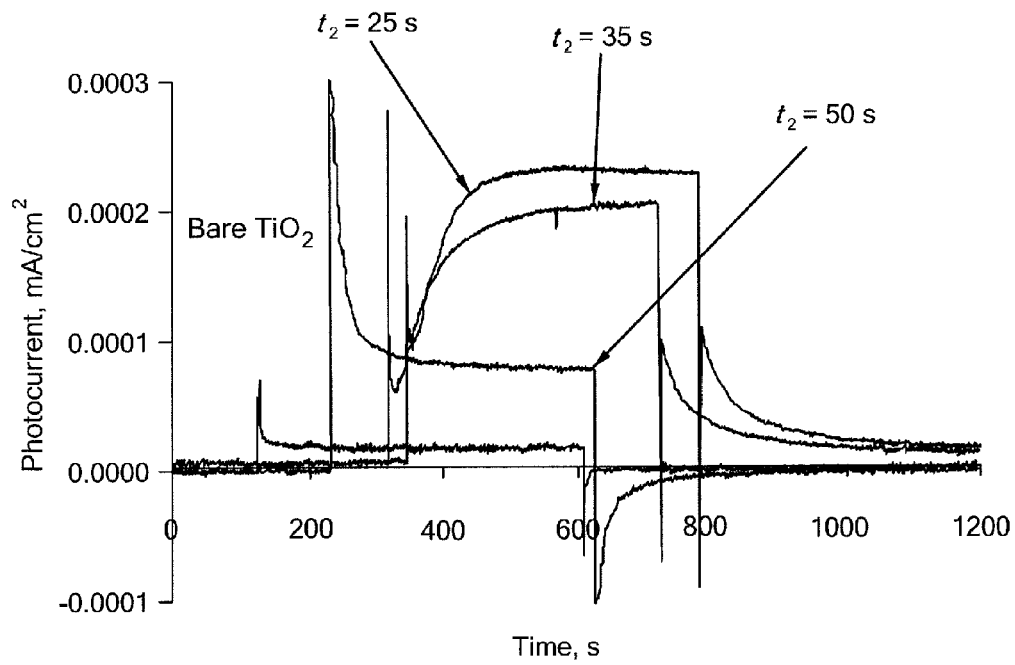
FIG. 9B shows the respective photocurrents generated by a pulse of UV light for a catalyst composite of titania and Au/Fe—Au nanowires corresponding to the three deposition time conditions shown in FIG. 9A.
Figure 9C:
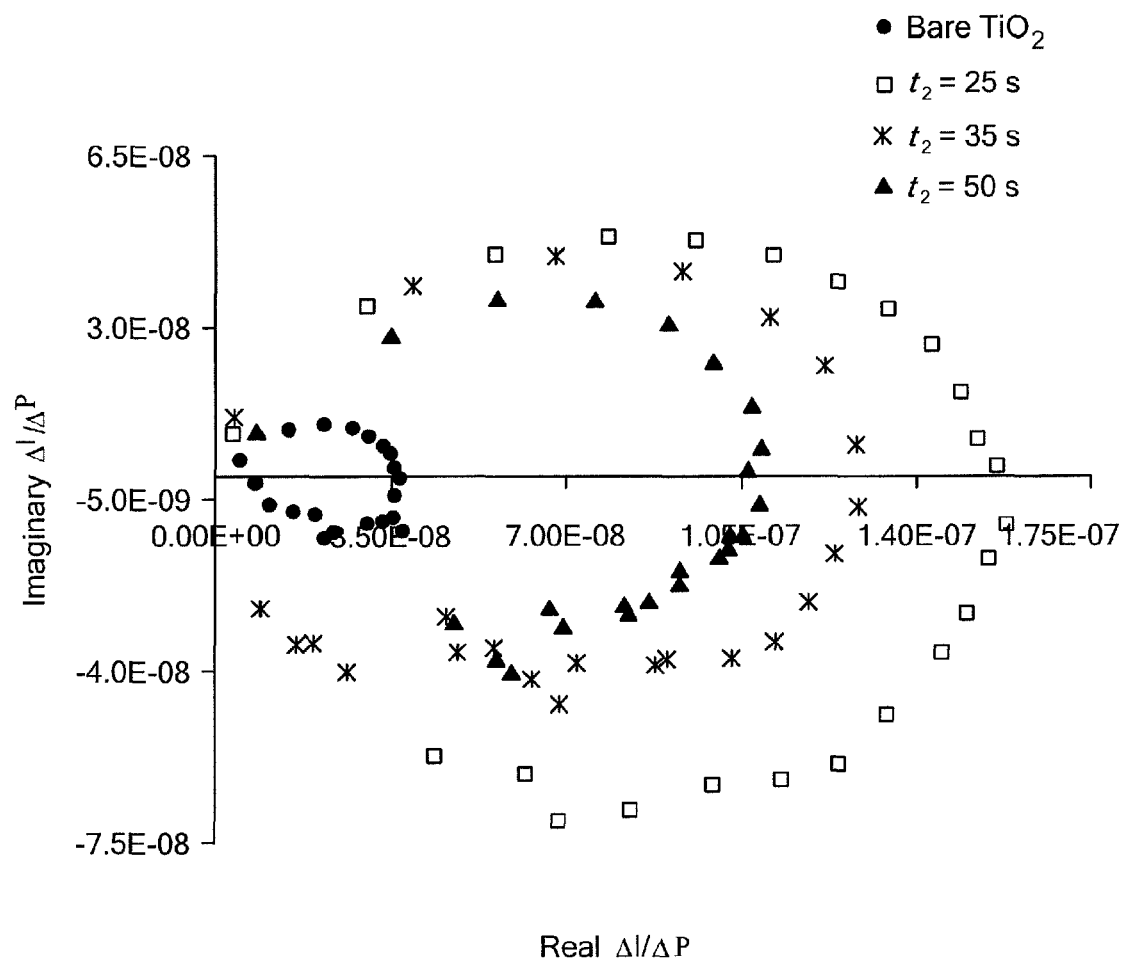
FIG. 9C shows the corresponding IMPS data.

FIG. 9 shows the nanostructure (FIG. 9A), step illumination responses (FIG. 9B) and IMPS behavior (FIG. 9C) for the composite catalyst as a function of the deposition time of the FeAu segments of the nanowires in the composite. The step illumination responses for the bare $TiO_2$ catalyst is also shown for comparison in FIG. 9B. The photocurrents were assessed at OCP conditions. The presence of Au/FeAu nanowires on $TiO_2$ enhanced the photoactivity of the bare semiconductor. This improved performance of the composite was also reflected on IMPS semicircles of greater diameter in comparison to that generated by bare $TiO_2$ (FIG. 9C), suggesting that a contributing factor for this enhancement was an increased flux of holes to the electrode surface, whose numerical value is proportional to the right-hand semicircle intersection with the real axis.[47]

FIG. 6 shows an analogous comparison of nanostructure (FIGS. 6B-6D), step illumination responses (FIG. 6A) and IMPS behavior (FIG. 6E) for different pulse currents used during formation of the FeAu nanowire layer.

FIGS. 9 and 6 show the effect of porosity and composition of the FeAu layer of nanowires integrated onto $TiO_2$ on the step illumination response and IMPS behavior. Relatively high Fe content and/or decreased porosity adversely affected the photocatalytic performance of the composite. A previous study[43] has shown a gradual decrease in porosity upon increasing solely the deposition time of the FeAu layer, $t_2$, of nanowires from 25 to 35 and further to 50 seconds. The illumination step responses (FIG. 9B)) and IMPS graphs (FIG. 9C)) generated when these three morphologically different nanowires were combined with $TiO_2$ were compared. The highest photoactivity was observed for the composite with nanowires of greatest porosity (i.e. $t_2=25$ s, TEM image i) in FIG. 9A); however, a drop in the step illumination response was noticed for composites with nanowires of decreased porosity (i.e. $t_2=35$ s and $t_2=50$ s, TEM pictures ii) and iii), respectively). This detrimental effect of extended $t_2$ (i.e. decreased porosity) on the photoactivity manifested itself as slightly shrunken IMPS semicircles (FIG. 9C)), suggesting that an effect of reduced porosity on the photoactivity arose from a reduction in the flux of holes to the surface. The smallest semicircle in FIG. 9C was that generated by the bare semiconductor, which was consistently reflected in the poorest reaction rate in FIG. 9B. Variations in $i_2$ did not affect the recombination time constant, $\tau$, extracted from the maximum of the frequency in IMPS graphs. However, a significant recombination was apparent by inspecting the qualitative features of the photocurrent transients[45-46] at $i_2=50$ s, where the relaxation and overshoot regions were remarkable and symmetrical and the photocurrent response relatively small. In contrast, in the cases where $i_2$ was either 25 or 35 s, the unsteady state regions of the step response did not show such typical high-recombination characteristics and the photoresponse was relatively high.

The photoactivity of the composite catalyst was severely affected when the applied pulse current for the FeAu layer, $i_2$, of nanowires was increased to more negative values (FIG. 6). By shifting $i_2$ from −10 to −15 mA/cm$^2$, a decrease in porosity and a simultaneous increase in the Fe content of nanowires has been previously reported.[43] $TiO_2$ combined with Au/FeAu nanowires with highly porous FeAu layers and lowest Fe content (i.e., $i_2=-10$ mA/cm$^2$, TEM image FIG. 6B) exhibited the highest photocurrent response (0.22 μA/cm$^2$), which fell to 0.084 μA/cm$^2$ and further to 0.039 μA/cm$^2$ by shifting $i_2$ to −12 and −15 mA/cm$^2$, respectively (TEM pictures FIGS. 6C, 6D). IMPS graphs for corresponding cases in FIG. 6C) showed a significant reduction in the semicircle diameter from $i_2=-10$ mA/cm$^2$ towards $i_2=-15$ mA/cm$^2$, reflecting a gradual decay in the flux of holes to the surface. The numerical value of the semicircle intersection with the real axis was $1.56\times10^{-7}$, $9.0\times10^{-8}$ and $5.85\times10^{-8}$ when $i_2$ respectively equaled −10, −12 and −15 mA/cm$^2$. From inspection of the qualitative features of the illumination step response,[45-46] it was observed that unsteady state regions became increasingly more prominent and symmetrical as $i_2$ was shifted from −10 towards −15 mA/cm$^2$. These observations suggested an enrichment in hole recombination taking place in the composite at more negative $i_2$ values, i.e. the photocurrent relaxation and overshoot were noticeable when $i_2$ was either −12 or −15 mA/cm$^2$ and almost negligible when $i_2=-10$ mA/cm$^2$. The noticeable effect of $i_2$ on photoactivity is believed to arise from variations in porosity of the nanowires; however, the experimental evidence presented here suggests that increased Fe content had an additional adverse effect on photocatalytic performance by promoting recombination.

These coupled adverse effects, i.e., a reduction in the flux of holes to the surface and a significant (promoted) recombination, taken together caused a remarkable reduction in the photoactivity as they became significant upon increasing $i_2$. Relatively high charge carrier recombination observed in $Fe_2O_3$ photoanodes has been acknowledged in the literature as one of the explanatory mechanisms of poor photocurrent efficiencies for the photoinduced dissociation of water.[38-41] Other properties exhibited by iron oxide such as a high resistivity,[41,49] low electron mobility,[50] short hole diffusion length[37] and oxygen vacancies in excess,[49] also do not favor its consideration as a potential semiconductor for water splitting applications. Furthermore, the natural formation of an $Fe_3O_4$ layer of high conductivity onto the $Fe_2O_3$ surface seems to additionally reduce its photocatalytic potential, likely via a promoted charge recombination.[39-40] Here, however, the purpose of incorporating Fe was to provide the catalyst material with corrosion protection against Au aging and/or deactivation effects.

Example 6

Analysis of Photocatalytic Deactivation

Figure 10A:
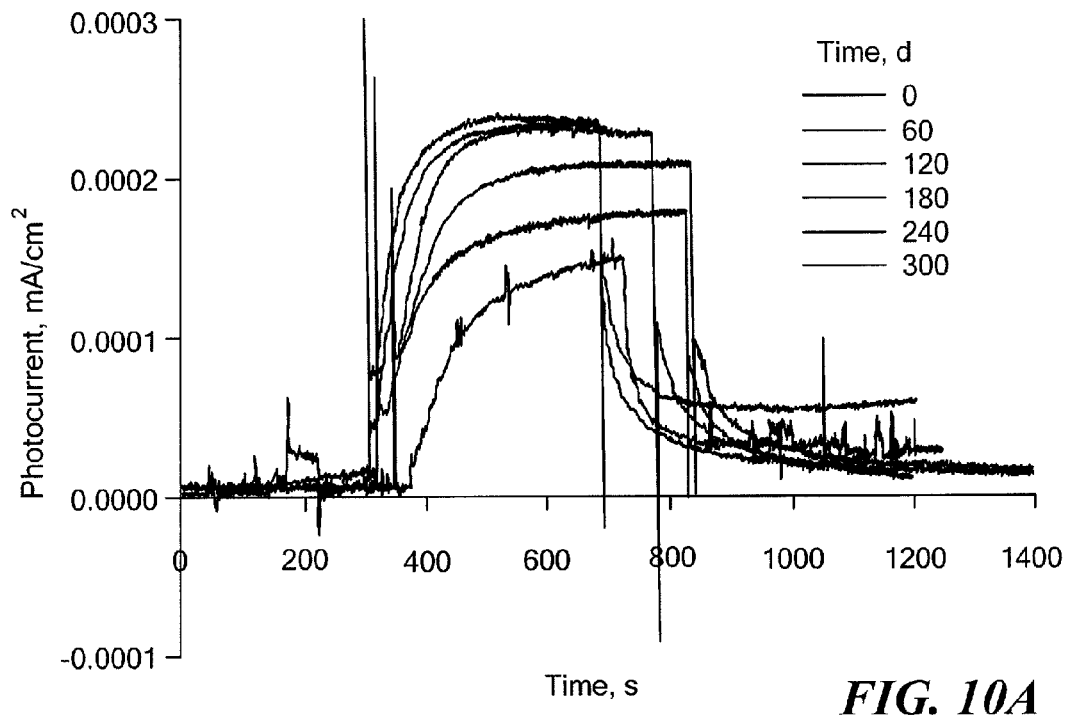
FIG. 10 shows the effect of aging on step illumination current (FIGS. 10A-10C) and IMPS (FIGS. 10D-10F) for titania-Au/Fe—Au catalyst composites having different values of Fe—Au deposition time ($t_2$). The $t_2$ values were 25 s for FIGS. 10A and 10D, 35 s for FIGS. 10B and 10E, and 50 s for FIGS. 10O and 10F. The $i_2$ value was −10 mA/cm$^2$ for all.
Figure 10B:
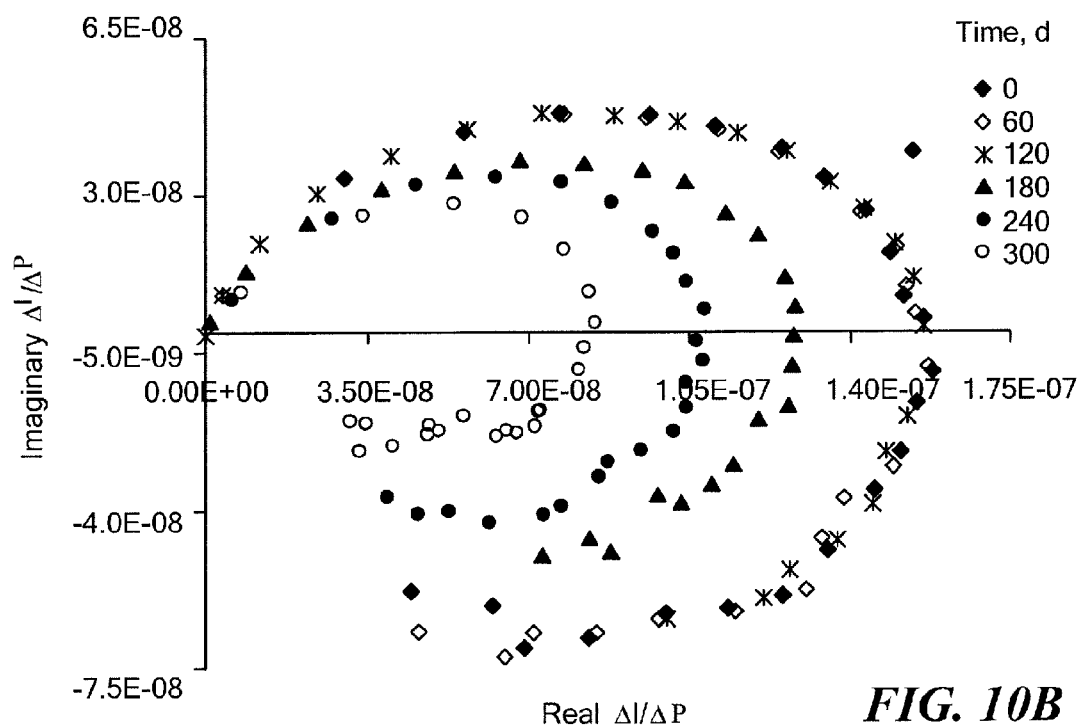
Figure 10C:
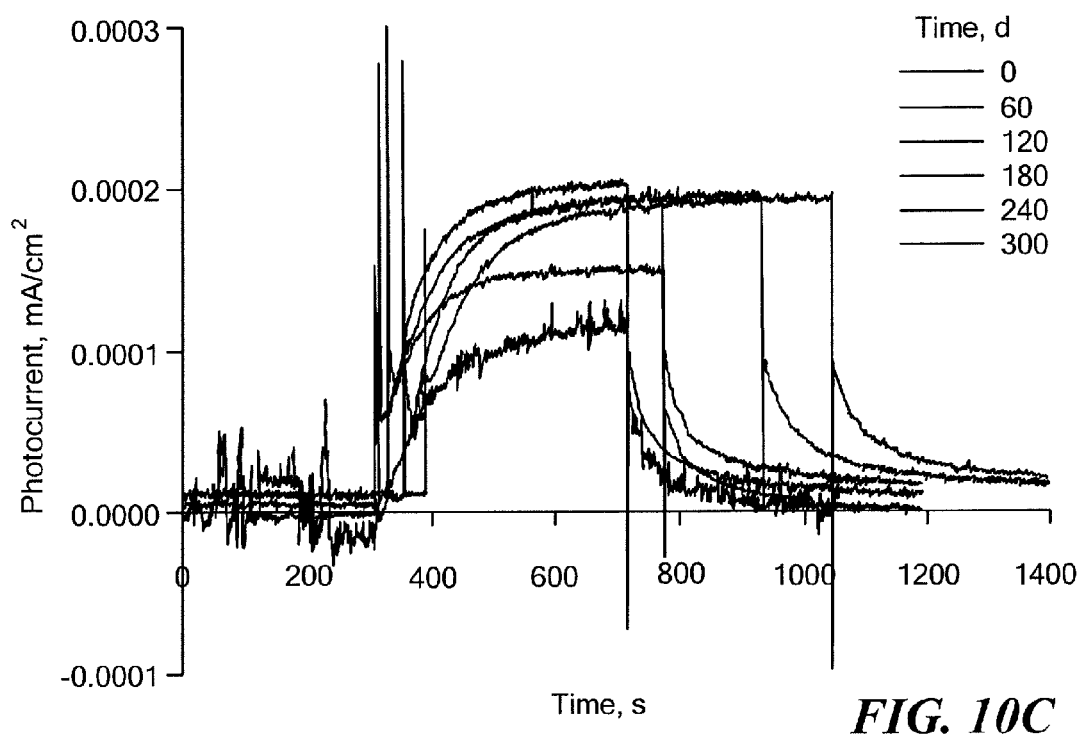
Figure 10D:
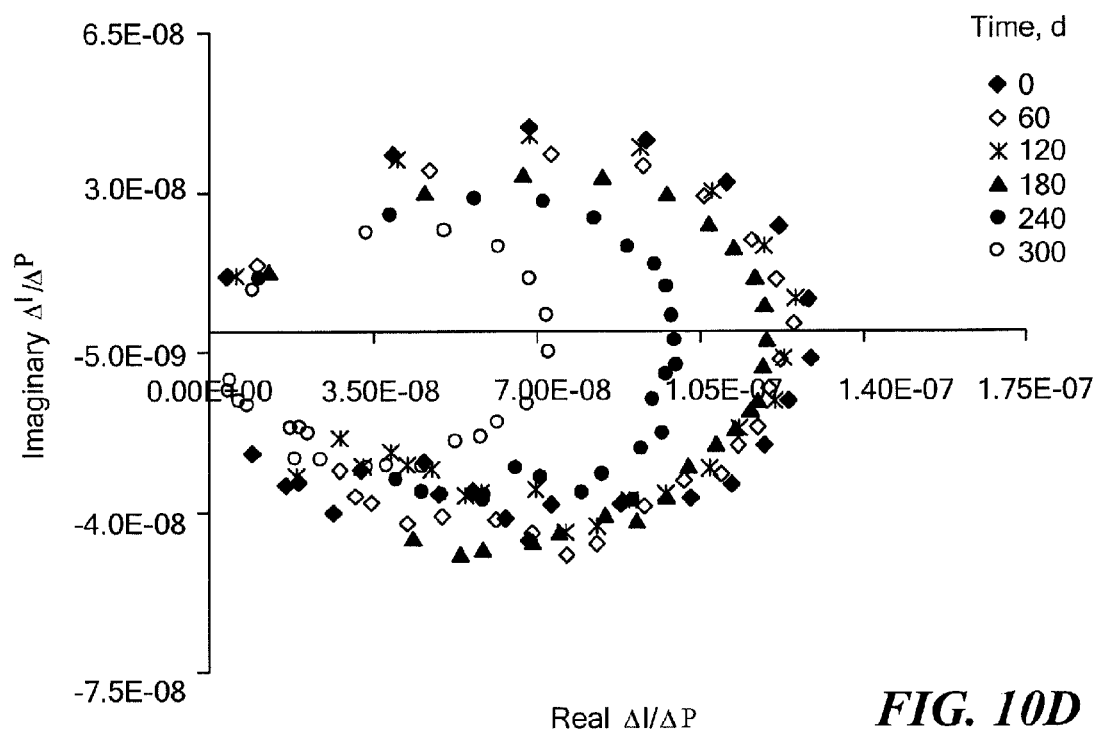
Figure 10E:
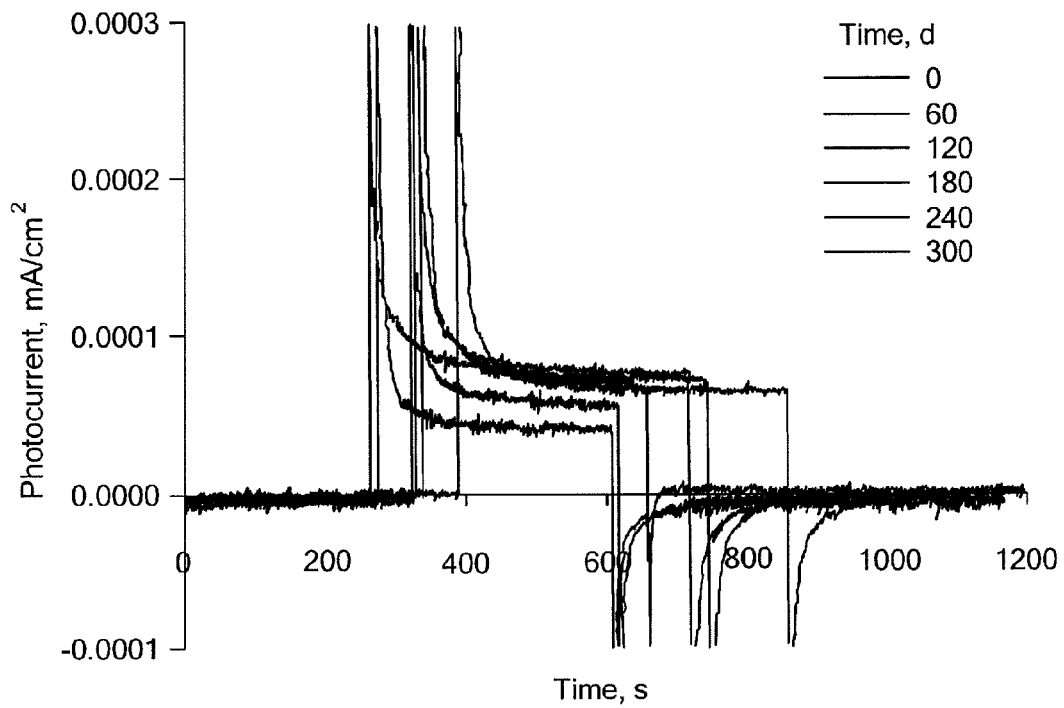
Figure 10F:
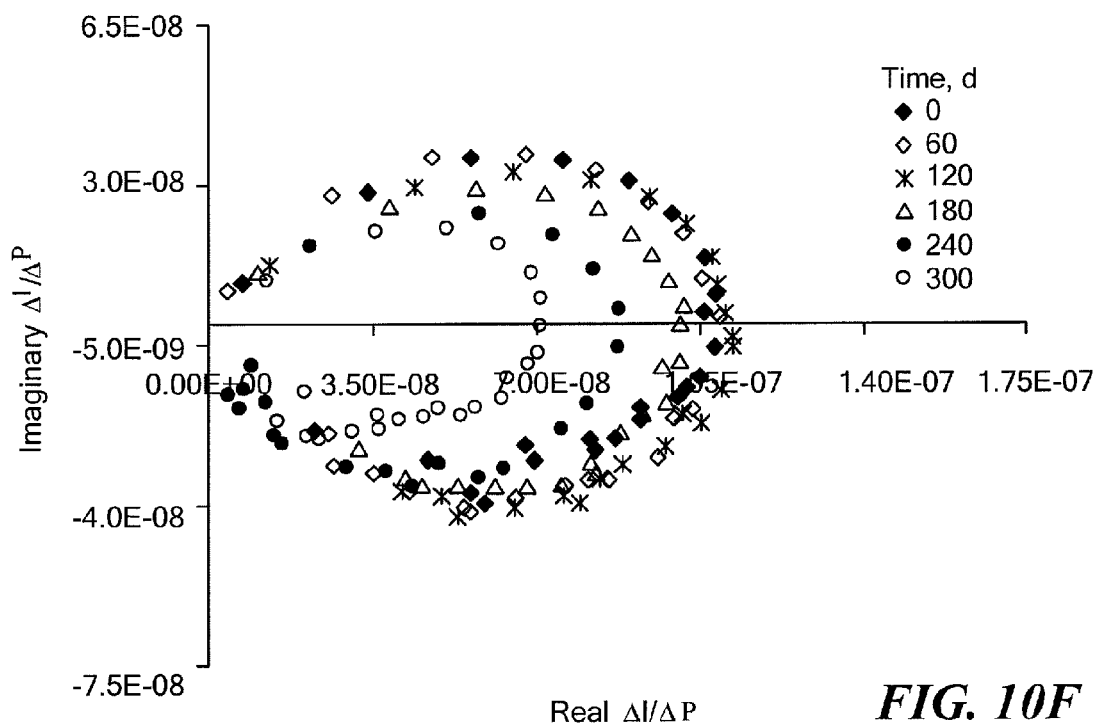

The efficacy of the photocatalyst for Au deactivation prevention by means of Fe incorporation was assessed for several of the different catalyst composites described above. The results are presented in FIGS. 10 and 12. For comparison purposes, the photocatalytic performance and aging effects of a Fe-free composite made of $TiO_2$ combined with Au solid nanowires were peripherally recorded and presented in FIG. 11. The results for the composites shown in FIG. 9A were split apart in separate graphs for FIG. 10. The illumination step responses and IMPS determinations were recorded as function of aging time, every 60 days, for a period of 300 days. FIGS. 10A and 10B correspond to the case where the deposition time of the FeAu layer of nanowires, $t_2$, was 25 s, whereas FIGS. 10C and 10D are for the composite where $t_2$=35 s, and FIGS. 10E and 10F were obtained for the composite with $t_2$=50 s. All cases in FIG. 10 showed a decay in photoactivity with time of approximately the same magnitude and similar IMPS behavior, suggesting that variations in $t_2$ (i.e. porosity)[43] of the FeAu layer of nanowires combined with $TiO_2$ did not significantly impact the efficacy of catalysts at inducing Au corrosion resistance. In FIG. 10A, the photoactivity was unaffected over a period of 120 days. A subsequent relatively small decrease of about 9% was observed from 120 to 180 d. This drop further fell by about 22% at 240 d, and approximately 60% of the initial photocurrent response was still retained at 300 d. In FIGS. 10C and 10E, the photoactivity of fresh catalyst was insignificantly affected up to 180 d. After this time, a drop of about 27% was observed from 180 to 240 d, and at 300 d about 55% of the initial activity was determined at either $t_2$=25 s or $t_2$=35 s. This trend was reflected in the IMPS behavior as well. For the case where $t_2$=25 s, shown in FIG. 10B, the semicircles at 60 and 120 d practically overlapped with that generated by the fresh catalyst (0 days). At longer times, the semicircle diameter gradually decreased towards 300 d. In FIGS. 10D and 10F, a similar shrinking in the IMPS semicircle diameter was observed; however, it started later (at 180 d) than the case where $t_2$=25 s. These IMPS results suggest that, in the cases presented in FIG. 10, catalyst deactivation occurred via a reduction in the flux of holes to the surface. Any effect coming from the recombination time constant, $\tau$, on catalyst deactivation was unclear, since the numerical values for z extracted from the maximum of the frequency in FIGS. 10B, 10D, and 10F) did not show a dependence on aging time. Neither did the qualitative features of unsteady state regions of the step illumination response in any of the three cases shown in FIGS. 10A, 10C, and 10E. Since the recombination constant is proportional to the sum of the rate constants, $k_{et}$ and $k_{rec}$, these observations suggest two possible conclusions: either (i) the photoactivity was unaffected by $k_{rec}$ during the aging period, or, (ii) if there was any effect, it was masked by simultaneous variations in $k_{et}$.

Figure 11A:
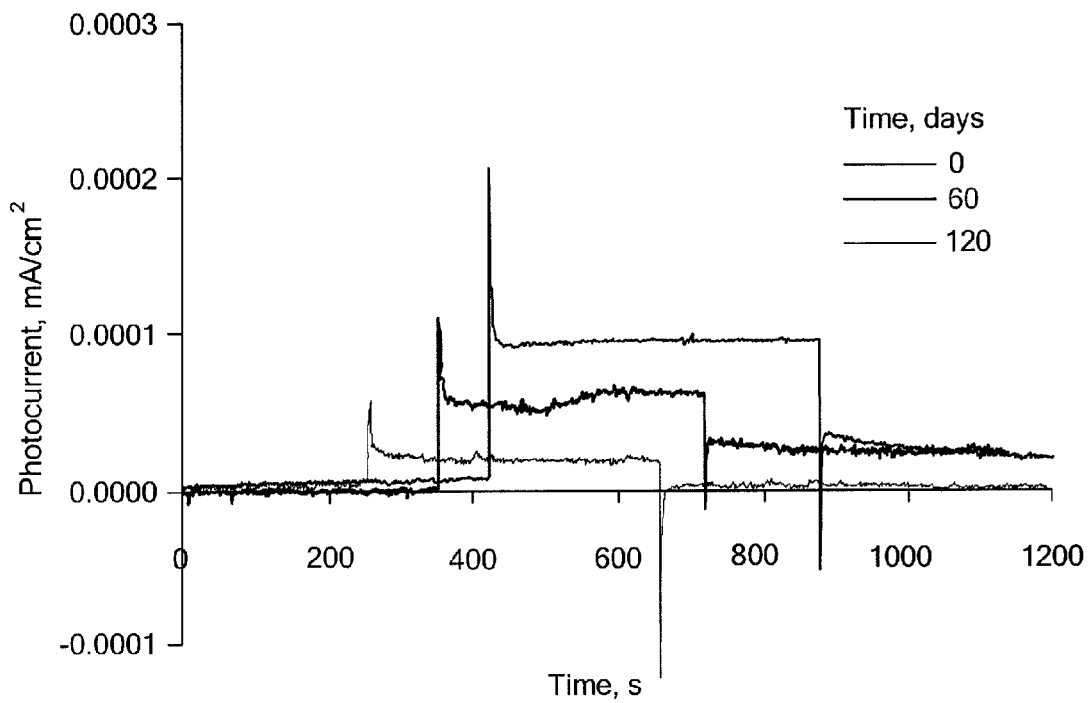
FIG. 11 shows the effect of aging time on the photogenerated current (FIG. 11A) and IMPS (FIG. 11B) for catalyst composites lacking the Fe—Au alloy (i.e., for titania-Au composite).
Figure 11B:
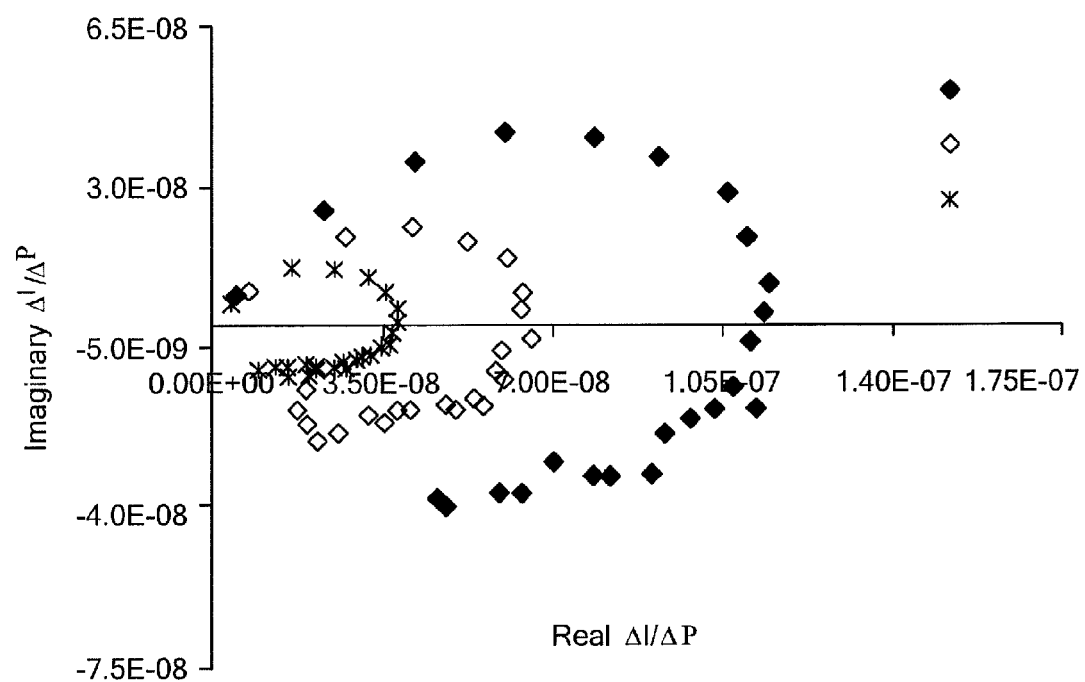

Aging and/or deactivation effects were comparatively more significant in the Fe-free catalyst than in the Fe containing composites described above. Photoactivity retention for prolonged times in the latter (FIG. 10) contrasted with the relatively quick deactivation of the Fe-free catalyst shown in FIG. 11. A drop in the photocurrent response of approximately 40% was observed within the first 60 days, and at 120 days only about 19% of the initial photoactivity was maintained (FIG. 11A). This prominent drop in the photocurrent response was reflected on a noticeable shrinking of the IMPS semicircles (FIG. 11B) with aging time within a period of 120 d. FIG. 11 shows that at the end of this lapse, both the reaction rate and the IMPS response were comparable to that generated by fresh, bare $TiO_2$, which suggested a complete Au deactivation at 120 d. These results consistently indicate that Fe incorporated in galvanic contact with Au in the form of Au/FeAu multilayered nanowires and their subsequent attachment onto the surface of $TiO_2$ is a strategy to effectively prevent aging and/or deactivation effects observed in the Au—$TiO_2$, Fe-free system. Furthermore, comparison of IMPS data in FIGS. 10B, 10D, and 10F with that in FIG. 11B leads to the conclusion that the initial photoactivity of the composite was maintained over time via a much slower decrease in the flux of holes to the electrode surface than in the Fe-free case. In addition, qualitative features of transients in the $AuTiO_2$ system (FIG. 11A) did not show typical high recombination characteristics, contrasting with those cases with relative high Fe content discussed below (FIGS. 12A and 12B), indicating that charge carrier recombination is promoted by the presence of Fe in the composite.

Figure 12A:
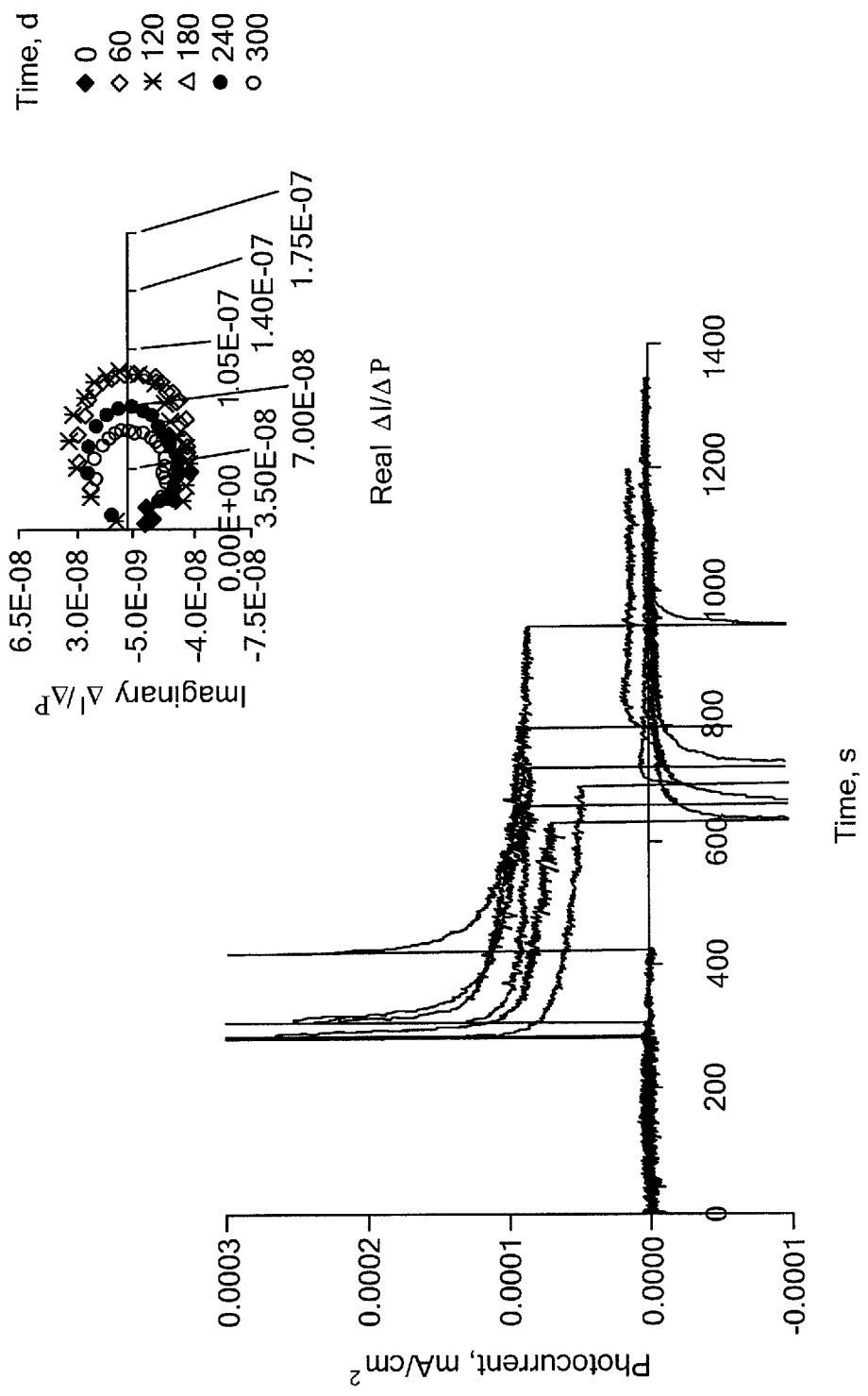
FIGS. 12A and 12B show the effect of aging on step illumination current and IMPS (insets) for titania-Au/Fe—Au catalyst composites having different values of Fe—Au deposition current density ($i_2$). The $i_2$ values were −12 mA/cm$^2$ for FIG. 12A and −15 mA/cm$^2$ for FIG. 12B. The $t_2$ value was 25 s for both FIGS. 12A and 12B.
Figure 12B:
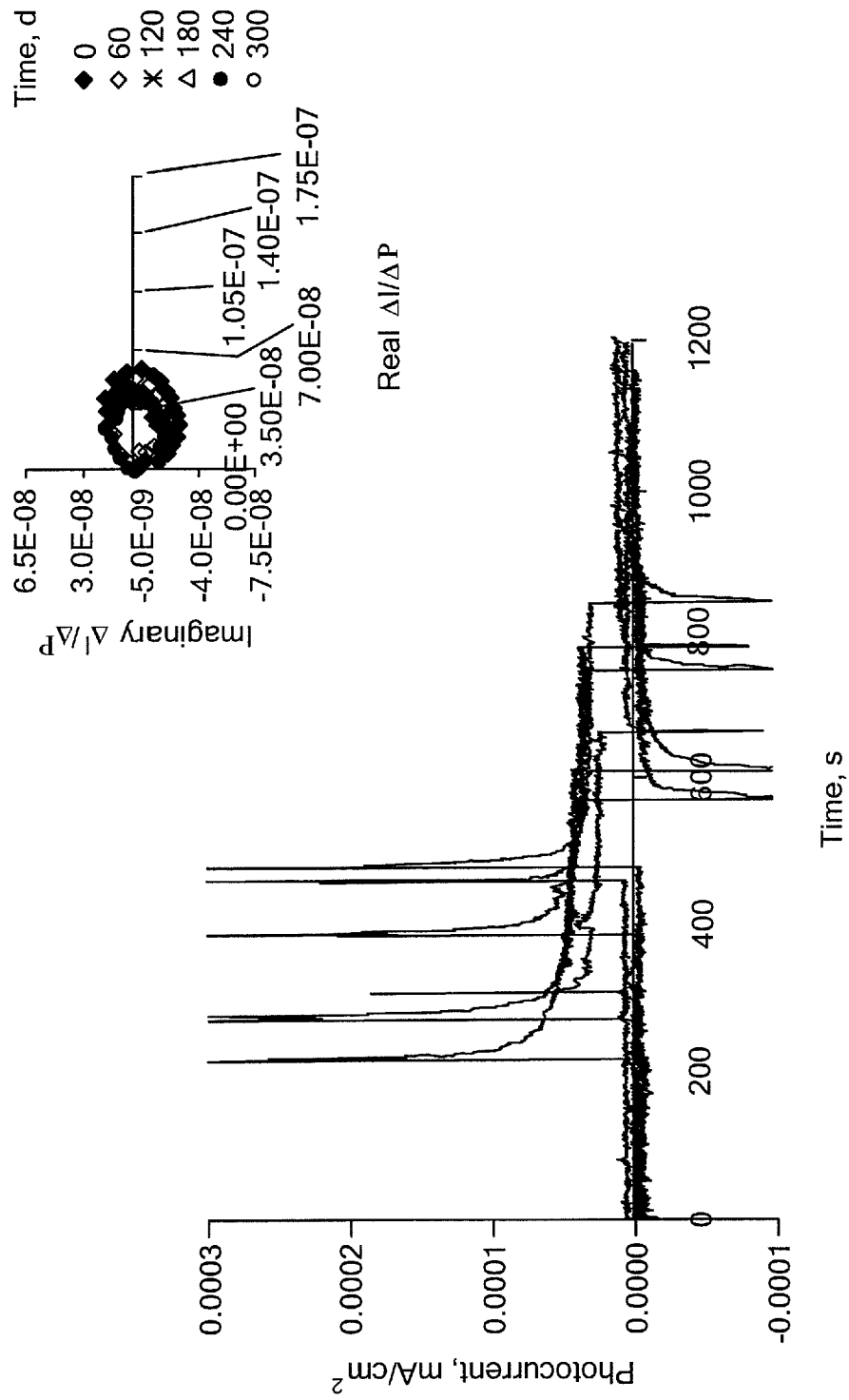

FIG. 12 shows the photoactivity and IMPS behavior (insets) as function of aging time for the cases where the applied pulsed current for the FeAu layer of nanowires, $i_2$, was −12 mA/cm$^2$ (FIG. 12A) and −15 mA/cm$^2$ (FIG. 12B). In either case, the protective role of Fe against catalyst deactivation was again confirmed. The photoactivity of fresh catalyst was insignificantly affected within a period of 180 d; however, it started to decrease more noticeably after this time. A drop in the reaction rate of about 25% was observed from 180 to 240 d. The measurement at 300 d showed that approximately 55% of the initial photogenerated current was still retained in either FIG. 12A or FIG. 12B. These results were consistent with the IMPS behavior shown in the insets, where the semicircles generated at 0, 60, 120, and 180 d closely overlapped, and a subsequent shrinking was seen during the aging period from 180 to 240 d. At the fifth aging cycle (i.e., at 300 d) a drop in the numerical value of the IMPS semicircle intersection with the real axis of about 35% was observed relative to that of the fresh catalyst (0 d). FIGS. 12A and 12B show approximately the same decay in photoactivity with aging, and a very similar IMPS trend, suggesting that variations in $i_2$ (i.e., changes in porosity and Fe content)[43] of the AuFe layer of nanowires did not influence the catalyst efficacy at preventing Au deactivation. In FIG. 12, similarly as in FIG. 10, there was not a significant difference in the qualitative features of transients with aging time, which made it difficult to draw conclusions on any relationship between recombination and aging. However, the recombination time constant, $\tau$, showed a gradual decrease during the aging process. In FIG. 12A, the numerical value of this parameter extracted from the maximum of frequency in IMPS graphs for fresh catalyst was 0.065 s, which dropped to 0.034 s at 60 d, and remained constant afterwards. For the case shown in FIG. 12B, the measured $\tau$ at 0, 60 and 120 d was 0.484 s, this value fell to 0.159 s from 120 to 180 d, and further to 0.021 s from 180 to 240 d. The data suggest that for the cases shown in FIG. 12, not only a decrease in the flux of holes to the surface, but also an adverse drop in $\tau$, both simultaneously, led to the observed decrease in photoactivity with time. It was discussed above that increased Fe content in the composite promotes recombination. Among all cases tested, those cases presented in FIG. 12 had the highest Fe percentage.[43] It was therefore not unexpected to find a promoted recombination reflected as decreased $\tau$ values as the aging process progressed. Even when there were two adverse mechanisms taking place during the aging period, the photoactivity showed a decrease similar to that found in FIG. 10, where catalyst deactivation was found to be adversely affected only by the flux of holes to the surface. The data confirm the robustness of the Au/FeAu—$TiO_2$ design at preventing Au corrosion effects. Comparisons between the step illumination responses shown in FIG. 12 with those for the Au—$TiO_2$, Fe-free catalyst further showed that the drop in photoactivity with time was significantly lower in the former case than in the Fe-free catalyst shown in FIG. 11. Differences in IMPS data between these two cases again suggested that Fe effectively protects the photoactivity with time by slowing down the drop in the flux of holes to the electrode surface.

Figure 13:
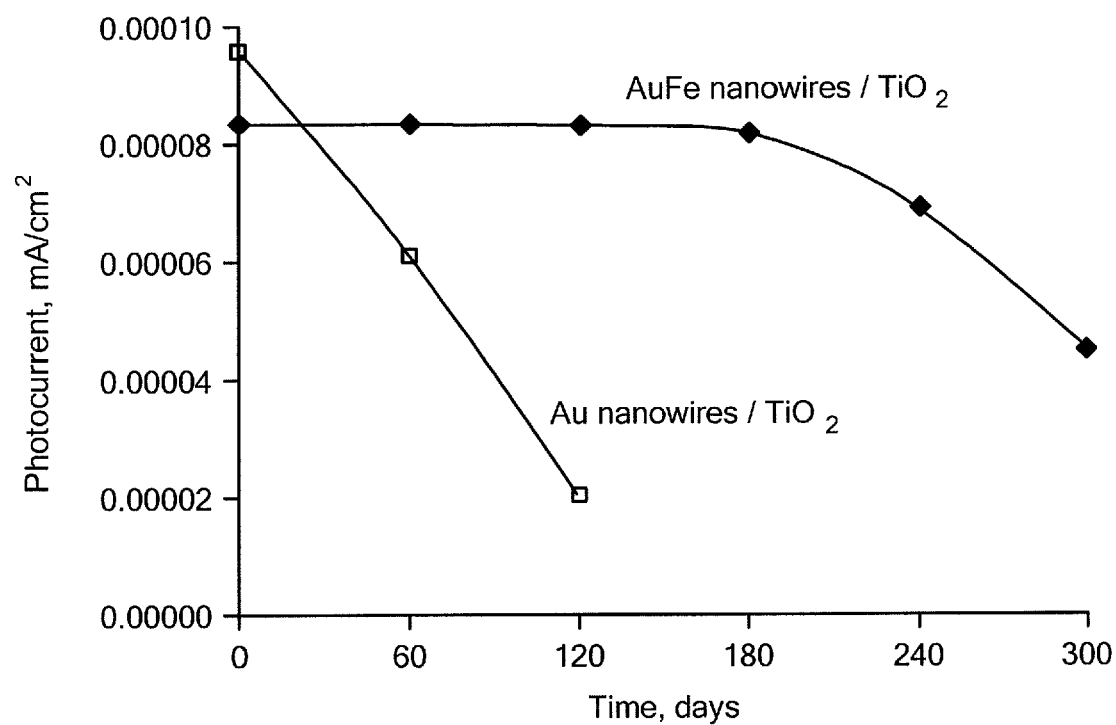
FIG. 13 shows the stability of UV-induced photocurrent as a function of time for photocatalyst composites of titania-Au/Fe—Au and of titania-Au.

FIG. 13 summarizes the stability of the photocurrent induced by pulses of UV light in the accelerated aging tests described above. Data are represented for both a Au/FeAu—TiO$_2$ composite and for a similar composite lacking Fe. The Au/FeAu—TiO$_2$ catalyst composite ("AuFe nanowires/TiO$_2$") was stable for at least 180 days, whereas the performance of the composite lacking Fe (Au nanowires/TiO$_2$") began to degrade immediately.

REFERENCES

1. Bicelli, L. P. *Int. J. Hydrogen Energy*, 1986, 11, 555.
2. Getoff, N. Int. J Hydrogen Energy, 1990, 15, 407.
3. Fujishima, A.; Honda, K. Nature, 1972, 238, 37.
4. Bard, A. J. J. Photochem., 1979, 10, 59.
5. Bard, A. J. J. Phys. Chem., 1982, 86, 172.
6. Bard, A. J.; Fox, M. A. Acc. Chem. Res., 1995, 28, 141.
7. Murphy, A. B.; Barnes, P. R. F.; Randeniya, L. K.; Plumb, I. C.; Grey, 1. E.; Home, M. D.; Glasscock, J. A. Int. J. Hydrogen Energy, 2006, 31, 1999.
8. Wagner, F. 'F.; Somorjai, G. A. J. Am. Chem. Soc., 1980, 102, 5494.
9. Wagner, F. T.; Somorjai, G. A. Nature, 1980, 285, 559.
10. Ashokkumar, M. Int. J. Hydrogen Energy, 1998, 23, 427.
11. Domen, K.; Naito, S.; Soma, M.; Onishi, T.; Tamaru, K. 1. Chem. Soc., Chem. Commun., 1980, 543.
12. Kawai, T.; Sakata, 1. J. Chem. Soc., Chem. Commun., 1979, 23, 1047.
13. B. Kraeutler and A. J. Bard. J. Am. Chem. Soc., 1978, 100, 4317.
14. Kamat, P. V. Pure Appl. Chem., 2002, 74, 1693.
15. Sato, S.; White, J. M. Chem. Phys. Lett., 1980, 72, 83.
16. Fretwell, R.; Douglas, P. Photochem. Photobiol. Sci., 2002, 1, 793.
17. Sakata, T.; Kawai. T.; Hashimoto, K. Chem. Phys. Lett., 1982, 88, 50.
18. Nosaka, Y.; Norimatsu, K.; Miyama, H. Chem. Phys. Lett., 1984, 106, 128.
19. Aspnes, D. E.; Heller, A. J. Phys. Chem., 1983, 87, 4919.
20. Yin, Y.; Tan, X.; Hou, F.; Zhao, L. Front. Chem. Eng. China, 2009, 3, 298.
21. Heller, A. Pure Appl. Chem., 1986, 58, 1189.
22. Ohtani, B.; Zhang, S. W.; Ogita, T.; Nishimoto, S.; Kagiya, T. I. Photochem. Photobiol, A, 1993, 71, 195.
23. Papp, J.; Shen, H. S.; Kershaw, R.; Dwight, K.; Wold, Chem. Mater., 1993, 5, 284.
24. Kamat, P. V.; Flumiani, M.; Dawson, A. Colloids Surf, A, 2002, 202, 269.
25. Idakiev, V.; Tabakova, T.; Yuan, Z.-Y.; Su, B.-L. Appl. Catal. A, 2004, 270, 135.
26. Elhajj, J.; Ismail, M. N.; Warzywoda, J.; Sacco, A. Jr.; Kurtz, R.; Podlaha, E. J. J. Electrochem. Soc., 2010, 157, D5.
27. Tian, Y.; Tatsuma, T. J. Am. Chem. Soc., 2005, 127, 7632.
28. Yu, K.; Tian, Y.; Tatsuma, T. Phys. Chem. Chem. Phys., 2006, 8, 5417.
29. Gao, Y.; Lee, W.; Trehan, R.; Kershaw, R.; Dwight, K.; Wold, A. Mat. Res. Bull., 1991, 26, 1247.
30. Sakthivel, S., Shankarb, M. V., Palanichamyb, M., Arabindoob, A., Bahnemanna, D. M., Murugesanb, V. Water Res., 2004, 38, 3001.
31. Li, X. Z., Li, F. B. Environ. Sci. Technol., 2001, 35, 2381.
32. Subramanian, V.; Wolf, E.; Kamat, P. V, J. Phys. Chem. B, 2001, 105, 11439.
33. Burke, L. D.; Ahern, A. J.; O'Mullane, A. P. Gold Bulletin, 2002, 35/1, 3.
34. Kamat, P. V. Pure Appl. Chem., 2002, 74, 1693.
35. Nijhuis, T. A.; Weckhuysen, B. M. Catal. Today, 2006, 117, 84.
36. Standard Potentials in Aqueous Solution, A. J. Bard, R. Parsons, and J. Jordan, Editors, Marcel Dekker, NY (1985).
37. Kennedy, J. H.; Frese, K. W. Jr.]. Electrochem. Soc., 1978, 125, 709.
38. Bjorksten, U.; Moser, J.; Gratzel, M. C'hem. Mater., 1994, 6, 858.
39. Dare-Edwards, M. P.; Goodenough, J. B.; Hamnett, A.; Trevellick, P. R. J. Chem. Soc. Faraday Trans., 1983, I, 2027.
40. Leygraf, C.; Hendewerk, M.; Somorjai, G. J. Solid State Chem., 1983, 48, 357.
41. Cherepy, N. J.; Liston, D. B.; Lovejoy, J. A.; Deng, H.; Zhang, J. Z. J. Phys. Chem. B, 1998, 102, 770.
42. Tian, Y.; Wang, X.; Zhang, D.; Shi, X.; Wang, S. J. Photochem. Photobiol. A, 2008, 199, 224.
43. Lucatero, S; Fowle, W. H.; Podlaha, E. J. Electrochem. Solid-State Lett., 2009, 12, D96.
44. Lucatero, S; Podlaha, E. J. J. Electrochem. Soc., 2010, 157, D370.
45. Peter, L. M.; Li, J.; Peat, R.; Lewerenz H. J. Electrochem. Acta, 1990, 35, 1657.
46. Peter, L. M. Chem Rev., 1990, 90, 753.
47. Ponomarev, E. A.; Peter, L. M. J Electroanal. Chem., 1995, 396, 219.
48. Georgieva, J.; Armyanov, S.; Valova, E.; Poulios, I.; Sotiropoulos, S. Electrochim. Acta, 2006, 51, 2076.
49. Warnes, B. F.; Aplan, F. F.; Simkovich, G. Solid State Ionics, 1984, 12, 271.
50. Launay, J. C.; Horowitz, G. J. Crystal Growth, 1982, 57, 118.
51. Jessy Elhajj, Miriam Ismail, Julio Warzywoda Albert Sacco Jr., Richard Kurtz and Elizabeth J. Podlaha, *"Electrochemical Fabrication of TiO$_2$—Au Nanocomposites," Journal of Electrochemical Society,* 157 (1) D5-D9 (2010).
52. Sung-Hyeon Baeck, Thomas F Jaramillo, Alan Kleiman-Shwarsctein and Eric W McFarland, "Automated electrochemical synthesis and characterization of TiO$_2$ supported Au nanoparticle electrocatalysts," Measurement Science and Technology, 16, 54-59 (2005).
53. M. Pourbaix, Atlas of electrochemical equilibria in aqueous solutions. 2d English ed. 1974, Houston, Tex.: National Association of Corrosion Engineers.
54. M. Guan and E. J. Podlaha, "Electrodeposition of AuCo Alloys and Multilayers," *Journal of Applied Electrochemistry,* 37 (5) 549-555 (2007).
55. R. Long and N. English, Chem. Mater. (2010) 22:1616-1623.

The invention claimed is:

1. A photocatalyst comprising a TiO$_2$ material in surface contact with a plurality of nanostructures, the nanostructures comprising a noble metal in galvanic contact with a non-noble metal, wherein the noble metal is in galvanic contact with said TiO$_2$ material and acts as an electron trap during a photocatalytic redox reaction, and wherein the non-noble metal maintains the noble metal in a reduced state.

2. The photocatalyst of claim 1, wherein the noble metal is selected from the group consisting of Au, Ag, Pt, and mixtures thereof.

3. The photocatalyst of claim 1, wherein the non-noble metal is selected from the group consisting of Fe, Co, and mixtures thereof.

4. The photocatalyst of claim 1, wherein the noble metal is Au and the non-noble metal is Fe.

5. The photocatalyst of claim 1, wherein the nanostructures are in the form of nanowires, nanoparticles, nanoclusters, or nanocrystals.

6. The photocatalyst of claim 1, wherein the $TiO_2$ material comprises $TiO_2$ in the crystalline anatase or rutile form.

7. The photocatalyst of claim 1, wherein the $TiO_2$ material comprises $TiO_2$ particles deposited onto a substrate, the substrate comprising indium tin oxide or stainless steel.

8. The photocatalyst of claim 1, wherein the nanostructures cover not more than 25% of the surface area of the $TiO_2$ material.

9. The photocatalyst of claim 1, wherein the nanostructures comprise transverse layers of Au and an Fe-rich Fe—Au alloy disposed in alternating fashion along the length of the nanowires.

10. The photocatalyst of claim 9, wherein the thickness of the Fe—Au layers is less than or equal to the thickness of the Au layers.

11. The photocatalyst of claim 1 which catalyzes the photocatalytic electrolysis of water.

12. The photocatalyst of claim 11 which is incorporated at an anode of an electrochemical cell used to form oxygen and promote hydrogen production by electrolysis of water.

13. The photocatalyst of claim 1, wherein the photocatalytic activity of the catalyst remains stable for longer than the photocatalytic activity of a corresponding catalyst lacking the non-noble metal.

14. The photocatalyst of claim 13, wherein the presence of the non-noble metal extends the stability of the catalyst, measured as the photocurrent produced upon illumination with ultraviolet light, to at least 180 days in an accelerated aging test employing continuous pulsing with ultraviolet light.

15. The photocatalyst of claim 1 which catalyzes the photocatalytic oxidation of an organic compound.

16. A method of fabricating the photocatalyst of claim 1, the method comprising the steps of:
    (a) providing a $TiO_2$ material and a plurality of nanostructures comprising a noble metal in galvanic contact with a non-noble metal; and
    (b) depositing the nanostructures onto the surface of the $TiO_2$ material, such that the noble metal remains in galvanic contact with said $TiO_2$, to form the photocatalyst.

17. The method of claim 16, wherein the $TiO_2$ material comprises $TiO_2$ in the crystalline anatase or rutile form.

18. The method of claim 16, wherein the $TiO_2$ material comprises $TiO_2$ particles deposited on a substrate.

19. The method of claim 16, wherein the noble metal is selected from the group consisting of Au, Ag, Pt, and mixtures thereof.

20. The method of claim 16, wherein the non-noble metal is selected from the group consisting of Fe, Co, and mixtures thereof.

21. The method of claim 16, wherein the noble metal is Au and the non-noble metal is Fe.

22. The method of claim 16, wherein the nanostructures are in the form of nanowires, nanoparticles, nanoclusters, or nanocrystals.

23. The method of claim 22, wherein the nanostructures are nanowires, and the nanowires are made by electrodepositing a first layer comprising a noble metal and a second layer comprising a non-noble metal, the first and second layers deposited as alternating transverse layers, and wherein the electrodeposition is from an ionic or nanoparticulate form of each metal into a nanowire template.

24. The method of claim 23, wherein the current density for the deposition of the second layer is limited so as to achieve an optimum photocurrent when said photocatalyst is illuminated with ultraviolet light.

25. The method of claim 24, wherein the current density for the deposition of the second layer is about 10 $mA/cm^2$ or less.

26. A method of fabricating the photocatalyst of claim 1, the method comprising the steps of:
    (a) electrodepositing Au nanoparticles onto a $TiO_2$ material to create Au nuclei on the surface of the $TiO_2$ material;
    (b) electrodepositing Fe onto the Au nuclei by electrochemically reducing $Fe^{2+}$ from an electrolyte solution to form Au/Fe regions on the surface of the $TiO_2$ material; and optionally
    (c) electrodepositing Au onto the Au/Fe regions by electrochemically reducing $Au^+$ from an electrolyte solution to form an Au layer covering the Au/Fe regions.

27. A method of fabricating the photocatalyst of claim 1, the method comprising the steps of:
    (a) electrodepositing Fe nanoparticles onto a $TiO_2$ material to create Fe nuclei on the surface of the $TiO_2$ material; and
    (b) depositing Au onto the Fe nuclei by chemically displacing some of the Fe of the Fe nuclei with $Au^+$ or $Au^{3+}$ ions from solution to form Au/Fe regions on the surface of the $TiO_2$ material.

28. A method of producing hydrogen gas by photocatalytic electrolysis, the method comprising irradiating an aqueous electrolyte solution with light in an electrolytic cell having an anode and a cathode, the anode comprising the photocatalyst of claim 1, whereby a voltage between the anode and the cathode is produced and water molecules are split to form hydrogen and oxygen.

29. A method of oxidizing an organic compound by photocatalytic oxidation, the method comprising irradiating the compound with light in an electrolytic cell having an anode and a cathode, the anode comprising the photocatalyst of claim 1, whereby a voltage between the anode and the cathode is produced and the organic compound is oxidized.

30. The method of claim 29 which is used to remove organic contaminants from a material.

* * * * *